United States Patent
Brenner et al.

(10) Patent No.: US 12,518,171 B2
(45) Date of Patent: Jan. 6, 2026

(54) DATA GENERATION AND RETRAINING TECHNIQUES FOR FINE-TUNING OF EMBEDDING MODELS FOR EFFICIENT DATA RETRIEVAL

(71) Applicant: Goldman Sachs & Co. LLC, New York, NY (US)

(72) Inventors: Eliot P. Brenner, Westfield, NJ (US); Tianlong Xu, Atlanta, GA (US); Koustuv Dasgupta, Scarsdale, NY (US); Dinesh Gupta, Princeton, NJ (US)

(73) Assignee: Goldman Sachs & Co. LLC, New York, NY (US)

( * ) Notice: Subject to any disclaimer, the term of this patent is extended or adjusted under 35 U.S.C. 154(b) by 0 days.

(21) Appl. No.: 18/896,663

(22) Filed: Sep. 25, 2024

(65) Prior Publication Data

US 2025/0117666 A1  Apr. 10, 2025

Related U.S. Application Data

(60) Provisional application No. 63/589,276, filed on Oct. 10, 2023.

(51) Int. Cl.
*G06N 3/091* (2023.01)
(52) U.S. Cl.
CPC .................................. *G06N 3/091* (2023.01)
(58) Field of Classification Search
CPC ...................................................... G06N 3/091
See application file for complete search history.

(56) References Cited

U.S. PATENT DOCUMENTS

| 10,002,129 B1* | 6/2018 | D'Souza | G06F 40/289 |
| 11,676,044 B1* | 6/2023 | Mazza | G06N 5/043 |
| | | | 706/11 |
| 2015/0095017 A1* | 4/2015 | Mnih | G06F 40/216 |
| | | | 704/9 |

(Continued)

FOREIGN PATENT DOCUMENTS

KR        20210151017 A        12/2021

OTHER PUBLICATIONS

Andriopoulos et al. ("Augmenting LLMs with Knowledge: A survey on hallucination prevention", arXiv 2023) (Year: 2023).*

(Continued)

*Primary Examiner* — Imad Kassim

(57) ABSTRACT

A method includes obtaining chunks of information and generating training samples for an embedding model using the chunks of information. Generating the training samples includes using at least one large language model to generate training samples in which different ones of the chunks of information are and are not relevant to different potential queries. The method also includes training the embedding model using the training samples. In some cases, the embedding model may represent a retriever model. For example, an input query may be obtained at the retriever model, and the retriever model may be configured to identify a specified number of chunks of information relevant to the input query. One or more of the chunks of information may be provided from the retriever model to a generative model, and the generative model may be used to create a response to the input query.

20 Claims, 7 Drawing Sheets

(56) References Cited

U.S. PATENT DOCUMENTS

| | | | | |
|---|---|---|---|---|
| 2022/0092266 | A1 | 3/2022 | Choi et al. | |
| 2022/0414137 | A1* | 12/2022 | Sewak | G06F 16/313 |
| 2023/0186464 | A1* | 6/2023 | Soliman | A61B 5/055 |
| | | | | 382/128 |
| 2023/0229710 | A1* | 7/2023 | Rosset | G06F 16/313 |
| | | | | 707/723 |
| 2023/0252549 | A1 | 8/2023 | Xie et al. | |
| 2023/0259692 | A1* | 8/2023 | Wright | G06F 40/56 |
| | | | | 704/9 |
| 2023/0297887 | A1* | 9/2023 | Gurgu | G06N 20/00 |
| | | | | 706/12 |
| 2023/0418848 | A1* | 12/2023 | Clinchant | G06F 40/40 |
| 2024/0061834 | A1* | 2/2024 | Tangari | G06F 16/24522 |

OTHER PUBLICATIONS

Naushan, "Transformer-based Sentence Embeddings", Medium, Dec. 2020, 9 pages.

Heckel et al., "Active Ranking from Pairwise Comparisons and the Futility of Parametric Assumptions", arXiv:1606.08842v1 [cs.LG], Jun. 2016, 27 pages.

International Search Report and Written Opinion of the International Searching Authority dated Jan. 15, 2025 in connection with International Patent Application No. PCT/US2024/050707, 11 pages.

Bonifacio et al., "InPars: Unsupervised Dataset Generation for Information Retrieval," SIGIR 22: The 45th International ACM SIGIR Conference on Research and Development in Information Retrieval, Jul. 2022, 7 pages.

Abonizio et al., "InPars Toolkit: A Unified and Reproducible Synthetic Data Generation Pipeline for Neural Information Retrieval," Jul. 2023, 7 pages.

SBERT.net, "Clustering," https://www.sbert.net/examples/sentence_transformer/applications/clustering/README.html#fast-clustering, Sep. 2021, 4 pages.

Pytorch, "BCEWithLogitsLoss," May 2024, 2 pages.

Wikipedia, "Rand index," Aug. 2023, 4 pages.

Wikipedia, "Adjusted mutual information," Dec. 2022, 3 pages.

Dai et al., "Promptagator : Few-Shot Dense Retrieval From 8 Examples," Sep. 2022, 21 pages.

\* cited by examiner

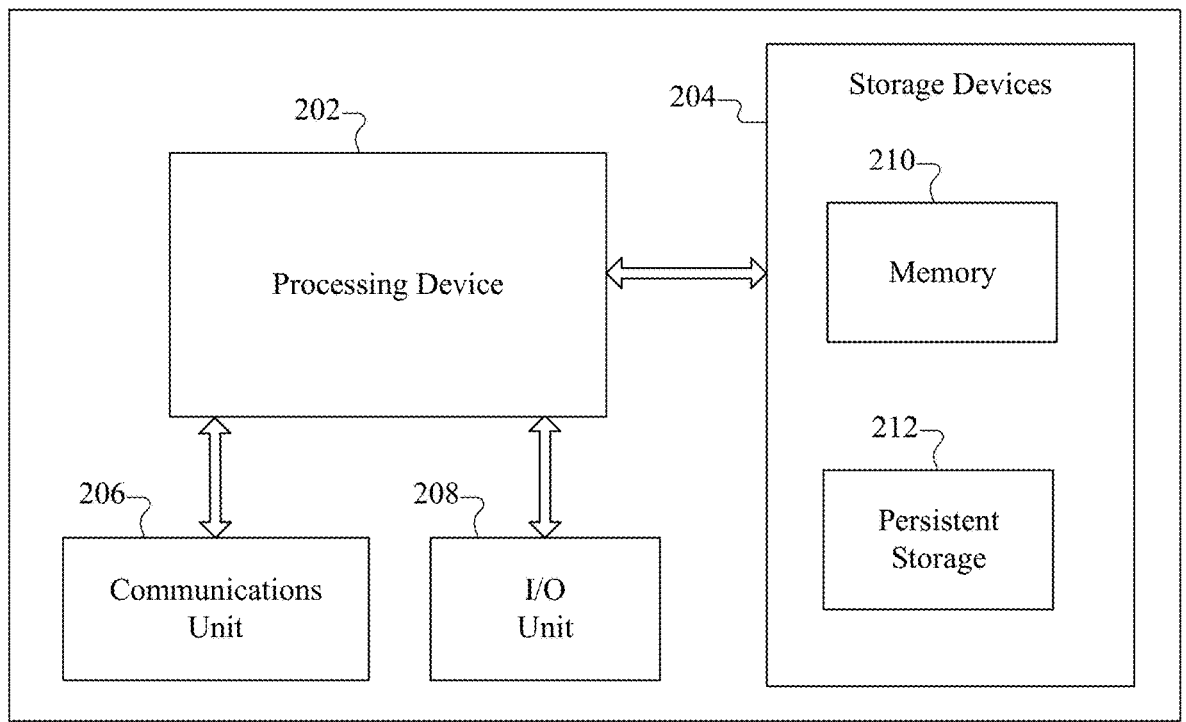
FIG. 2
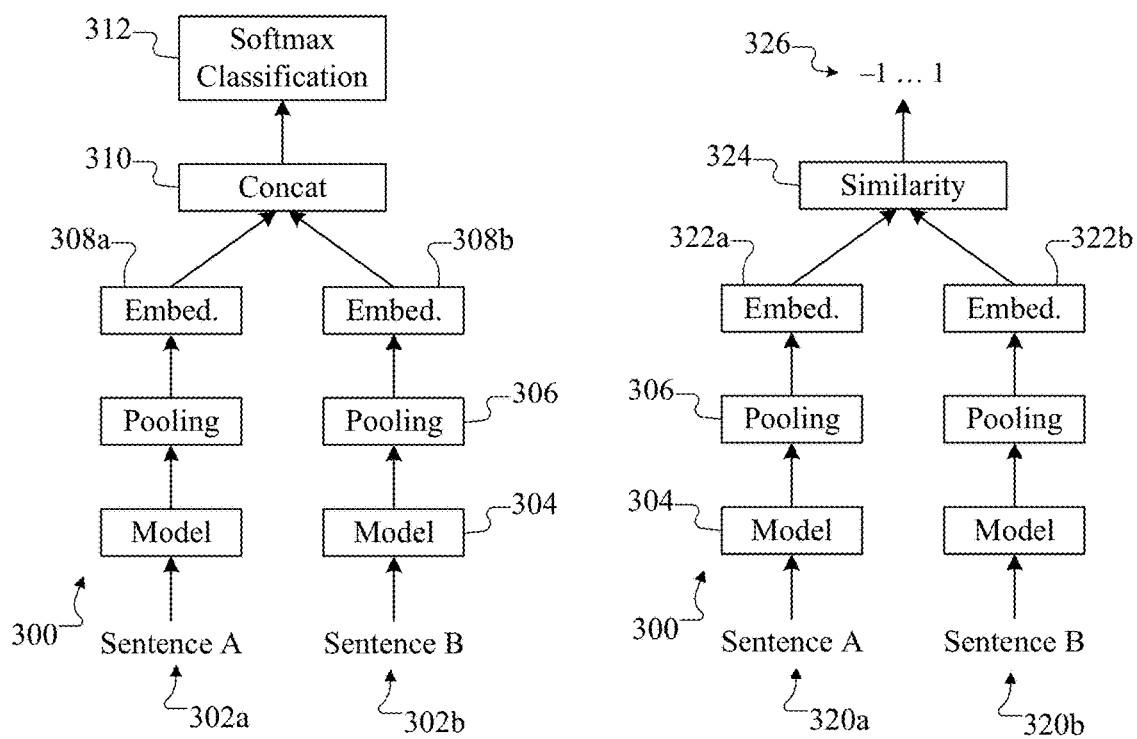
FIG. 3A
FIG. 3B

DATA GENERATION AND RETRAINING TECHNIQUES FOR FINE-TUNING OF EMBEDDING MODELS FOR EFFICIENT DATA RETRIEVAL

CROSS-REFERENCE TO RELATED APPLICATION AND PRIORITY CLAIM

This application claims priority under 35 U.S.C. § 119 (e) to U.S. Provisional Patent Application No. 63/589,276 filed on Oct. 10, 2023, which is hereby incorporated by reference in its entirety.

TECHNICAL FIELD

This disclosure is generally directed to machine learning systems and processes. More specifically, this disclosure is directed to data generation and retraining techniques for fine-tuning of embedding models for efficient data retrieval.

BACKGROUND

Large language models (LLMs) represent neural networks or other machine learning models that include many parameters (often billions of parameters) and that are trained on large quantities of unlabeled text using self-supervised learning. Many large language models use a transformer-based machine learning architecture and are pre-trained in a generative manner. Large language models can find use in a number of natural language processing (NLP) tasks or other tasks, such as when large language models are used to process input queries from users and generate natural language responses to the input queries.

SUMMARY

This disclosure relates to data generation and retraining techniques for fine-tuning of embedding models for efficient data retrieval.

In a first embodiment, a method includes obtaining chunks of information and generating training samples for an embedding model using the chunks of information. Generating the training samples includes using at least one large language model to generate training samples in which different ones of the chunks of information are and are not relevant to different potential queries. The method also includes training the embedding model using the training samples.

Any single one or any combination of the following additional features may be used with the first embodiment. Using the at least one large language model to generate the training samples may include providing the chunks of information to the at least one large language model with requests to generate the potential queries based on the chunks of information and using the at least one large language model to generate positive examples of potential queries in which the potential queries are answerable using the chunks of information. Using the at least one large language model to generate the training samples may include using a first large language model to rank the chunks of information in response to the potential queries and filtering out relevant chunks of information using a second large language model to identify negative examples of potential queries in which the potential queries are not answerable using remaining chunks of information. Using the at least one large language model to generate the training samples may include obtaining a set of the potential queries, using the at least one large language model to locate chunks of information that might be relevant to the potential query for each of at least a subset of the potential queries, and using the located chunks of information to generate positive examples of potential queries in which the potential queries are answerable using the located chunks of information. Each of the potential queries in the subset may be identified in response to a baseline large language model failing to identify a specified number of chunks of information for that potential query. The embedding model may represent a retriever model to be used to provide chunks of information to a generative model.

In a second embodiment, a method includes obtaining an input query at a retriever model, where the retriever model is configured to identify a specified number of chunks of information relevant to the input query. The method also includes providing one or more of the chunks of information from the retriever model to a generative model. The method further includes using the generative model to create a response to the input query, where the response is based on the one or more chunks of information. The retriever model is trained by obtaining training chunks of information, generating training samples for an embedding model using the training chunks of information, and training the embedding model using the training samples. Generating the training samples includes using at least one large language model to generate training samples in which different ones of the training chunks of information are and are not relevant to different potential queries. The trained embedding model represents the retriever model.

Any single one or any combination of the additional features described above relative to the first embodiment may be used with the second embodiment during training of the retriever model.

In a third embodiment, an apparatus includes at least one processing device configured to obtain chunks of information and generate training samples for an embedding model using the chunks of information. To generate the training samples, the at least one processing device is configured to use at least one large language model to generate training samples in which different ones of the chunks of information are and are not relevant to different potential queries. The at least one processing device is also configured to train the embedding model using the training samples.

Any single one or any combination of the following additional features may be used with the third embodiment. To use the at least one large language model to generate the training samples, the at least one processing device may be configured to provide the chunks of information to the at least one large language model with requests to generate the potential queries based on the chunks of information and use the at least one large language model to generate positive examples of potential queries in which the potential queries are answerable using the chunks of information. To use the at least one large language model to generate the training samples, the at least one processing device may be configured to use a first large language model to rank the chunks of information in response to the potential queries and filter out relevant chunks of information using a second large language model to identify negative examples of potential queries in which the potential queries are not answerable using remaining chunks of information. To use the at least one large language model to generate the training samples, the at least one processing device may be configured to obtain a set of the potential queries, use the at least one large language model to locate chunks of information that might be relevant to the potential query for each of at least a subset of the potential queries, and use the located chunks of information to generate positive examples of potential queries in which the potential queries are answerable using the located chunks of information. The at least one processing device may be configured to identify each of the potential queries in the subset in response to a baseline large language model failing to identify a specified number of chunks of information for that potential query. The embedding model may represent a retriever model to be used to provide chunks of information to a generative model. The at least one processing device may be configured to provide an input query to a retriever model that includes the trained embedding model, where the retriever model may be configured to identify a specified number of chunks of information relevant to the input query. The at least one processing device may be configured to provide one or more of the specified number of chunks of information from the retriever model to a generative model and use the generative model to create a response to the input query, where the response may be based on the one or more chunks of information.

In a fourth embodiment, a non-transitory computer readable medium contains instructions that when executed cause at least one processor to obtain chunks of information and generate training samples for an embedding model using the chunks of information. The instructions that when executed cause the at least one processor to generate the training samples include instructions that when executed cause the at least one processor to use at least one large language model to generate training samples in which different ones of the chunks of information are and are not relevant to different potential queries. The non-transitory computer readable medium also contains instructions that when executed cause the at least one processor to train the embedding model using the training samples.

Any single one or any combination of the following additional features may be used with the fourth embodiment. The instructions that when executed cause the at least one processor to use the at least one large language model to generate the training samples may include instructions that when executed cause the at least one processor to provide the chunks of information to the at least one large language model with requests to generate the potential queries based on the chunks of information and use the at least one large language model to generate positive examples of potential queries in which the potential queries are answerable using the chunks of information. The instructions that when executed cause the at least one processor to use the at least one large language model to generate the training samples may include instructions that when executed cause the at least one processor to use a first large language model to rank the chunks of information in response to the potential queries and filter out relevant chunks of information using a second large language model to identify negative examples of potential queries in which the potential queries are not answerable using remaining chunks of information. The instructions that when executed cause the at least one processor to use the at least one large language model to generate the training samples may include instructions that when executed cause the at least one processor to obtain a set of the potential queries, use the at least one large language model to locate chunks of information that might be relevant to the potential query for each of at least a subset of the potential queries, and use the located chunks of information to generate positive examples of potential queries in which the potential queries are answerable using the located chunks of information. The instructions when executed may cause the at least one processor to identify each of the potential queries in the subset in response to a baseline large language model failing to identify a specified number of chunks of information for that potential query. The embedding model may represent a retriever model to be used to provide chunks of information to a generative model. The non-transitory computer readable medium may contain instructions that when executed cause the at least one processor to provide an input query to a retriever model that includes the trained embedding model, where the retriever model may be configured to identify a specified number of chunks of information relevant to the input query. The non-transitory computer readable medium may contain instructions that when executed cause the at least one processor to provide one or more of the specified number of chunks of information from the retriever model to a generative model and use the generative model to create a response to the input query, where the response may be based on the one or more chunks of information.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 2 illustrates an example device supporting data generation and retraining techniques for fine-tuning of embedding models for efficient data retrieval according to this disclosure;

FIGS. 3A and 3B illustrate an example sentence transformer for use in a retriever model according to this disclosure;

DETAILED DESCRIPTION

Figure 1:
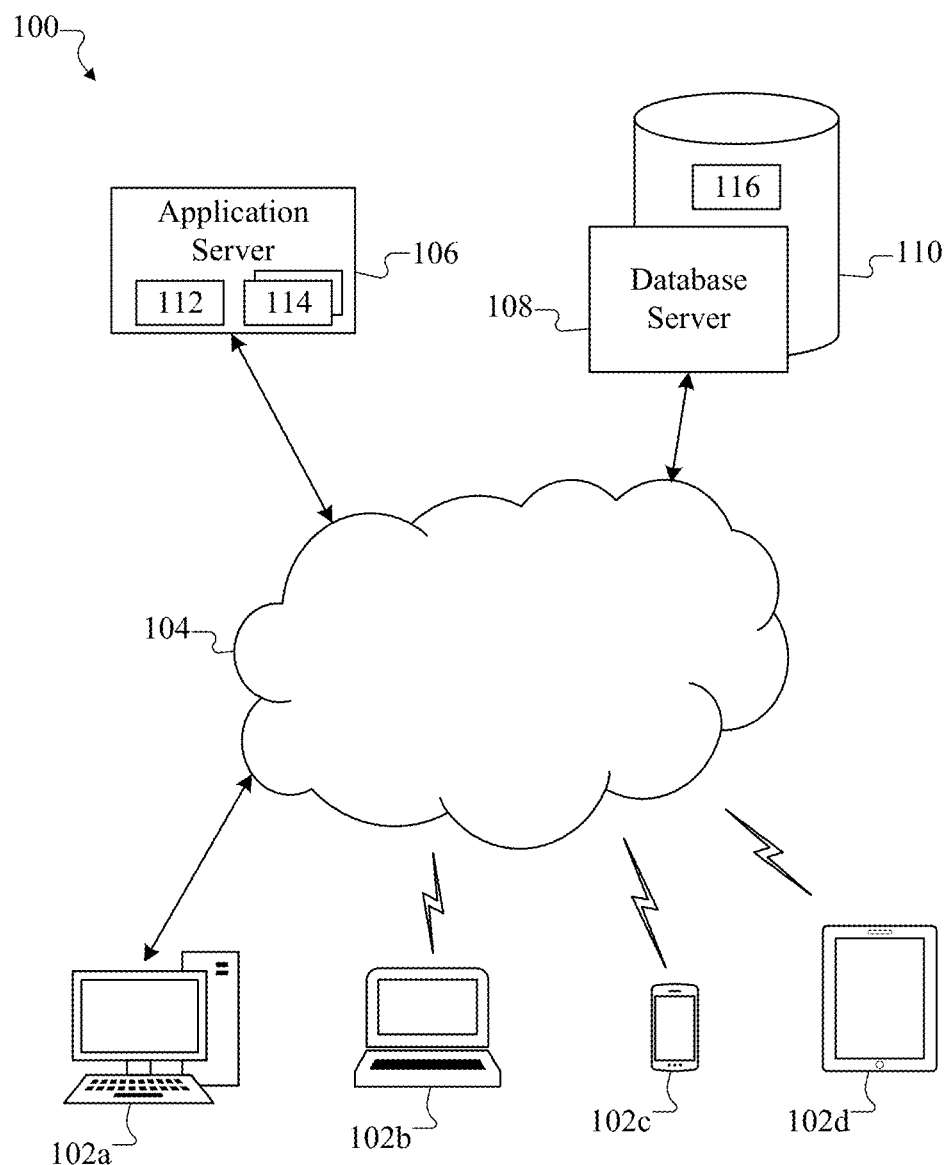
FIG. 1 illustrates an example system supporting data generation and retraining techniques for fine-tuning of embedding models for efficient data retrieval according to this disclosure.

FIGS. 1 through 10, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, large language models (LLMs) represent neural networks or other machine learning models that include many parameters (often billions of parameters) and that are trained on large quantities of unlabeled text using self-supervised learning. Many large language models use a transformer-based machine learning architecture and are pre-trained in a generative manner. Large language models can find use in a number of natural language processing (NLP) tasks or other tasks, such as when large language models are used to process input queries from users and generate natural language responses to the input queries.

Unfortunately, applying large language models to real-world mission-critical applications remains challenging. Among other reasons, this can be due to the tendency of large language models to be trained for general-purpose usage. This makes it difficult to apply the large language models to specialized domains, such as specialized fields like manufacturing, finance, and healthcare. Stated another way, large languages models have opened new horizons for professionals in numerous industries to interact with their data and knowledge stores in a much more natural way, such as via synchronous chat or via pre-set "questionnaires" asynchronously. However, these generative models typically have some limitations in that they are trained on general-purpose historical corpora. Consequently, these models often cannot answer questions requiring domain-specific or up-to-date information.

One technique for addressing these deficiencies is using a retrieval engine to search a domain-specific corpus for relevant documents or chunks to include in a prompt for a large language model. In these situations, these chunks are commonly referred to as "context" for the large language model. Although it might be more precise to refer to the entire prompt incorporating the chunks as the large language model's context, this terminology is adopted in this patent document. The entire system here may be referred to as a "retrieve-then-read pipeline," where the retrieval engine obtains relevant chunks and the large language model reads and processes those relevant chunks. Naturally, the success of the retrieve-then-read pipeline in practice can depend to a significant extent on the quality of the retrieved chunks, which may be rephrased in information retrieval (IR) terms as the relevance of the retrieved chunks to a query.

Experience has shown that in certain specialized domains (such as financial, healthcare, and other domains associated with specialized datasets), the performance of a retriever model used for large-scale retrieval can be a significant limiting factor on the success of a retrieve-then-read pipeline. The notion of similarity or relevance is subjective by nature and can differ greatly for specialized professional users in various domains versus ordinary general users, such as based on the use of vocabulary and other assumptions underlying the specialized domains. Open-source or general-purpose commercial (proprietary) models are often trained with information-retrieval needs of a general user in mind, not specialized professional users.

This disclosure provides techniques supporting data generation and retraining techniques for fine-tuning of embedding models for efficient data retrieval. As described in more detail below, a framework can include a retriever model and a generative model. In some cases, the generative model may represent a large language model. The retriever model can be used to receive and process input queries (such as from users), identify one or more relevant chunks of information associated with each input query, and provide the input queries and the relevant chunks as prompts to the generative model. The relevant chunks of information may be identified from documents, websites, or any other suitable source(s) of information. The generative model can process the relevant chunk(s) of information associated with each prompt and generate an output (such as a natural language output) for each prompt.

The retriever model can represent a trained machine learning model that is fine-tuned using synthetic training data. For example, the retriever model may be trained to generate embeddings, which are used to transform sentences into vectors. The embeddings can be used to identify which chunks of information are most relevant to queries, such as by identifying chunks of information represented by vectors that are closest (like in terms of cosine distance or Euclidean distance) to a vector representing a query. In some cases, the synthetic training data can be generated using at least one large language model, such as by using the at least one large language model to identify chunks of information that are treated as relevant or not relevant for training purposes. This allows the at least one large language model to be used to effectively generate annotated synthetic training data, including both positive examples (where training chunks of information are relevant to queries) and negative examples (where training chunks of information are not relevant to queries).

In this way, the described techniques may allow the retriever model to be fine-tuned (trained) more effectively to identify relevant chunks of information to be provided to the generative model, which can increase the quality of the outputs generated by the generative model. Among other things, the described techniques can address the gap in retrieve-then-read pipelines by fine-tuning custom retriever models based on in-domain datasets. One factor affecting the retriever model may be the definition of embeddings, and various motivations for some embodiments of the proposed framework described below can include (i) determining the efficacies of pre-trained (off-the-shelf) embeddings and (ii) developing novel datasets and fine-tuned custom embeddings for the datasets.

Example Architecture

FIG. 1 illustrates an example system 100 supporting data generation and retraining techniques for fine-tuning of embedding models for efficient data retrieval according to this disclosure. As shown in FIG. 1, the system 100 includes multiple user devices 102a-102d, at least one network 104, at least one application server 106, and at least one database server 108 associated with at least one database 110. Note, however, that other combinations and arrangements of components may also be used here.

In this example, each user device 102a-102d is coupled to or communicates over the network(s) 104. Communications between each user device 102a-102d and at least one network 104 may occur in any suitable manner, such as via a wired or wireless connection. Each user device 102a-102d represents any suitable device or system used by at least one user to provide information to the application server 106 or database server 108 or to receive information from the application server 106 or database server 108. Any suitable number(s) and type(s) of user devices 102a-102d may be used in the system 100. In this particular example, the user device 102a represents a desktop computer, the user device 102b represents a laptop computer, the user device 102c represents a smartphone, and the user device 102d represents a tablet computer. However, any other or additional types of user devices may be used in the system 100. Each user device 102a-102d includes any suitable structure configured to transmit and/or receive information, such as devices that can transmit user input queries and that can receive and present responses to the user input queries.

The at least one network 104 facilitates communication between various components of the system 100. For example, the network(s) 104 may communicate Internet Protocol (IP) packets, frame relay frames, Asynchronous Transfer Mode (ATM) cells, or other suitable information between network addresses. The network(s) 104 may include one or more local area networks (LANs), metropolitan area networks (MANs), wide area networks (WANs), all or a portion of a global network such as the Internet, or any other communication system or systems at one or more locations. The network(s) 104 may also operate according to any appropriate communication protocol or protocols.

The application server 106 is coupled to the at least one network 104 and is coupled to or otherwise communicates with the database server 108. The application server 106 supports various functions related to data generation and retraining techniques for fine-tuning of embedding models. For example, the application server 106 may perform various operations using a framework that includes one or more retriever models 112 and one or more generative models 114. Each retriever model 112 is configured to receive and process input queries (such as queries from the user devices 102a-102d), identify one or more relevant chunks of information associated with each input query, and provide the input queries and the relevant chunks of information as prompts to at least one generative model 114. The relevant chunks of information may be identified from documents, websites, or any other suitable source(s) of information. In some cases, for instance, the database 110 may store various documents 116 from which the relevant chunks of information may be extracted. Each generative model 114 is configured to process the relevant chunk(s) of information associated with each prompt and generate a response (such as a natural language output) for each prompt. In some cases, at least one generative model 114 can represent at least one large language model (LLM) or other machine learning model. Each response may be provided to the corresponding user device 102a-102d that provided the associated query or to any other suitable destination(s).

Each retriever model 112 can represent a machine learning model that is fine-tuned (trained) for efficient data retrieval. For example, each retriever model 112 may be trained to generate embeddings, and each retriever model 112 can be trained/fine-tuned using synthetic training data. Various techniques provided below allow at least some of the synthetic training data to be generated using at least one generative model 114 (such as at least one large language model). Note that the generative model(s) 114 used to generate the synthetic training data may or may not represent one or more of the generative models 114 used to generate responses to input queries. The at least one generative model 114 may be used to identify chunks of information that are treated as relevant or not relevant for training purposes, such as by generating annotated synthetic training data containing both positive examples and negative examples. In this way, the described techniques may allow the retriever model(s) 112 to be trained more effectively to identify relevant chunks of information to be provided to the generative model(s) 114, which can increase the quality of the outputs generated by the generative model(s) 114.

The database server 108 operates to store and facilitate retrieval of various information used, generated, or collected by the application server 106 and the user devices 102a-102d in the database 110. For example, the database server 108 may store the various documents 116 or other information from which relevant chunks of information may be extracted by the retriever model(s) 112. While the database server 108 and database 110 are shown here as being separate from the application server 106, the application server 106 may itself incorporate the database server 108 and the database 110.

Although FIG. 1 illustrates one example of a system 100 supporting data generation and retraining techniques for fine-tuning of embedding models for efficient data retrieval, various changes may be made to FIG. 1. For example, the system 100 may include any number of user devices 102a-102d, networks 104, application servers 106, database servers 108, databases 110, retriever models 112, generative models 114, and documents 116. Also, these components may be located in any suitable locations and might be distributed over a large area. In addition, while FIG. 1 illustrates one example operational environment in which data generation and retraining techniques for fine-tuning of embedding models may be used, this functionality may be used in any other suitable system.

FIG. 2 illustrates an example device 200 supporting data generation and retraining techniques for fine-tuning of embedding models for efficient data retrieval according to this disclosure. One or more instances of the device 200 may, for example, be used to at least partially implement the functionality of the application server 106 of FIG. 1. However, the functionality of the application server 106 may be implemented in any other suitable manner. In some embodiments, the device 200 shown in FIG. 2 may form at least part of a user device 102a-102d, application server 106, or database server 108 in FIG. 1. However, each of these components may be implemented in any other suitable manner.

As shown in FIG. 2, the device 200 denotes a computing device or system that includes at least one processing device 202, at least one storage device 204, at least one communications unit 206, and at least one input/output (I/O) unit 208. The processing device 202 may execute instructions that can be loaded into a memory 210. The processing device 202 includes any suitable number(s) and type(s) of processors or other processing devices in any suitable arrangement. Example types of processing devices 202 include one or more microprocessors, microcontrollers, digital signal processors (DSPs), application specific integrated circuits (ASICs), field programmable gate arrays (FPGAs), neural processing units (NPUs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 can include a network interface card or a wireless transceiver facilitating communications over a wired or wireless network. The communications unit 206 may support communications through any suitable physical or wireless communication link(s). As a particular example, the communications unit 206 may support communication over the network(s) 104 of FIG. 1.

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device. Note, however, that the I/O unit 208 may be omitted if the device 200 does not require local I/O, such as when the device 200 represents a server or other device that can be accessed remotely.

In some embodiments, the instructions executed by the processing device 202 include instructions that implement or support the use of the retriever model(s) 112 and the generative model(s) 114. Thus, for example, the instructions executed by the processing device 202 may cause the device 200 to obtain input queries, process the input queries using one or more retriever models 112, pass prompts (which may include input queries and relevant chunks of information) to one or more generative models 114, and process the relevant chunks of information using the one or more generative models 114 to generate outputs for users that are responsive to the input queries. The instructions executed by the processing device 202 may also or alternatively cause the device 200 to use at least one large language model or other generative model(s) 114 to generate synthetic training data for training one or more retriever models 112.

Although FIG. 2 illustrates one example of a device 200 supporting data generation and retraining techniques for fine-tuning of embedding models for efficient data retrieval, various changes may be made to FIG. 2. For example, computing and communication devices and systems come in a wide variety of configurations, and FIG. 2 does not limit this disclosure to any particular computing or communication device or system.

Example Retriever Models

The following provides additional details regarding example designs of a retriever model 112. Note that these details are for illustration and explanation only and that other implementations are possible and within the scope of this disclosure. For example, while a specific type of retriever model 112 is described below, this type of model is an example only, and retriever models 112 may be implemented using any other suitable machine learning model architecture.

One paradigm of information retrieval is to map, via an embedding model Φ (a retriever model 112), both queries Q and chunks of information C to a finite-dimensional vector space V. In some cases, the embedding model Φ can be defined as follows.

$$\Phi: Q \times C \to V \times V, \quad (1)$$

commonly implemented with $\Phi := \varphi \times \varphi$, where $$\varphi: (Vocab)^{\otimes n} \to V$$

Here, the expression $\varphi:(Vocab)^{\otimes n} \to V$ represents the embedding of text sequences into the vector space V. The similarity between a query and a chunk of information (or between different chunks of information) can be interpreted as a "distance." Distance can be implemented in various ways, such as by using dot-product similarity or Euclidean distance (possibly after a suitable normalization). In vector space, any distance metric m (such as cosine distance or Euclidean distance) can be used to intuitively define the notion of closeness or similarity of points corresponding to texts in Q and C. As a result, given a query $q \in Q$, an information retrieval system can retrieve the k closest chunks of information $c \in C$ to the query q, meaning the information retrieval system could be mathematically represented as follows.

$$M_{q,k} = \pi_k \circ \text{sort}_2 \circ (Id_2 \times m \circ (\varphi \times \varphi)): q \times C \to C^{\times k} \quad (2)$$

Here, $\pi_k$ represents a projection onto the first k chunks of information corresponding to the smallest distances, $\text{sort}_2$ represents sorting on the second factor (c), and $Id_2$ maps an ordered pair (q,c) to a single element (c) by acting as the identity on the second factor of the pair. This defines the information retrieval system based on an embedding φ, a distance metric m, and a parameter k>0.

Conventionally, the notation for the information retrieval system may be modified to the following shortened form.

$$M = m \circ \varphi \times \varphi \quad (3)$$

This notation leaves the following factors out of the explicit definition of an embedding model M because they are either left implicit or are fixed throughout development: q (variable but implicit), k (generally fixed at ten or another value), and the sorting and projection operations (both fixed and implicit). For even more concreteness, in some embodiments of the information retrieval system, the choice of the distance metric m may be defined as follows.

$$m = Euc \quad (4)$$

Here, Euc represents Euclidean distance, so the only significant difference between systems relates to their embeddings φ.

Despite several drawbacks, the paradigm above is convenient for several reasons. First, an embedding φ can be implemented as a neural network. Techniques and technologies for training neural networks are well-developed and have enormous momentum for further improvements, and the training process for neural networks can benefit from unsupervised pre-training on unlabeled corpora. Second, the computationally-intensive step of embedding a document corpus via the embedding φ can be performed "offline" or "at indexing time" (meaning asynchronously), amortizing an O(|C|)-time operation. Third, computations of m(φ(q),φ(c)) for all $c \in C$ implied by the above specification can be significantly "pruned" to a smaller number (such as a constant of about 100 to about 1000) as long as approximate nearest neighbor techniques are acceptable (which they typically are in practice). As a consequence, a system can be scaled to indices of essentially arbitrary sizes with constant query times.

In some embodiments, each of one or more retriever models 112 may include a sentence transformer. FIGS. 3A and 3B illustrate an example sentence transformer 300 for use in a retriever model 112 according to this disclosure. More specifically, FIG. 3A illustrates example training of the sentence transformer 300, and FIG. 3B illustrates example inferencing by the trained sentence transformer 300.

As shown in FIG. 3A, the sentence transformer 300 can receive and process two sentences 302a-302b, which in some cases may represent sentences or other portions of an input query Q and a chunk of information C or sentences or other portions of two chunks of information C. Each sentence 302a-302b is processed using a language model 304, such as a Bidirectional Encoder Representations from Transformers (BERT) model. In some cases, the language models 304 can represent networks having tied weights, thereby forming a Siamese network structure. The language models 304 can generate output vectors representing the sentences 302a-302b.

Pooling layers 306 can process the output vectors representing the sentences 302a-302b, such as by performing max pooling or average pooling. This results in the generation of a sentence embedding 308a (which may be denoted u) for the sentence 302a and a sentence embedding 308b (which may be denoted v) for the sentence 302b. In some cases, the pooling layers 306 can be used to produce fixed-sized sentence embeddings 308a-308b. A concatenation function 310 can combine the sentence embeddings 308a-308b and a difference between the sentence embeddings 308a-308b, and a softmax classification function 312 can process the resulting information to generate a prediction as to how similar the sentences 302a-302b are to one another. Predictions by the softmax classification function 312 can be used to calculate a loss of the sentence transformer 300, and the sentence transformer 300 can be adjusted during training until the loss achieves a suitably-low value.

As shown in FIG. 3B, once trained, the sentence transformer 300 can receive and process additional sentences 320a-320b using the language models 304 and the pooling layers 306 to generate additional sentence embeddings 322a-322b. A similarity function 324 can be used to compare the sentence embeddings 322a-322b and generate a similarity measure 326, which represents a measure of the similarity of the additional sentences 320a-320b. In this example, the similarity measure 326 may represent a value between −1 and +1, although other ranges for the similarity measure 326 may be used in a retriever model 112. The similarity function 324 may use any suitable technique to identify the similarities of the sentence embeddings 322a-322b, such as cosine distance or Euclidean distance.

Sentence transformers represent a convenient open-source or other software framework for training specialized embeddings φ for similarity search and retrieval. This approach by sentence transformers enables embeddings φ specific to the task of similarity retrieval and specific to a domain to be trained and deployed, which is in contrast to other approaches involving retraining "general purpose" embeddings using a language model (which is vastly more computationally-expensive and may have unclear benefits) for a specific retrieval task at hand. One potentially simpler and more immediately-applicable path to retraining sentence transformer embeddings may be available, and this approach can involve the use of some "labeled" data (in some cases on the order of about one million data points) in the form of "triples." These triples can have the form (query, more relevant document/chunk, less relevant document/chunk). This means that one challenge towards developing embedding models for retrieval is sourcing such triples in a specialized target domain. The description below provides solutions to this challenge.

Although FIGS. 3A and 3B illustrate one example of a sentence transformer for use in a retriever model 112, various changes may be made to FIGS. 3A and 3B. For example, sentence transformers may be implemented using any other suitable machine learning model architecture. Also, retriever models 112 may be implemented in any other suitable manner and do not necessarily require the use of sentence transformers.

Example Retriever Model Training Data Generation

The following provides additional details regarding example training/fine-tuning of the retriever models 112. More specifically, the following describes how these triples or other suitable training data can be generated in order to support suitable training of one or more retriever models 112. In general, training samples for an embedding model may be generated using chunks of information, where one or more large language models are used to generate training samples in which (i) different ones of the chunks of information are relevant to different potential input queries and (ii) different ones of the chunks of information are not relevant to different potential input queries. The embedding model can be trained using the training samples and used as a retriever model 112, which allows the embedding model to be used to provide relevant chunks of information to one or more generative models 114.

In some embodiments, triples or other suitable training data can be generated based on a specific well-defined corpus and optionally a preset list of input queries. The corpus and the optional preset list of input queries can easily vary depending on the implementation and use case. In the following discussion, it may sometimes be assumed that the specific corpus is being used with a retrieve-then-read pipeline to support a question and answer (Q&A) system that provides investment analysts with a conversational experience when interacting with and extracting information from earnings call transcripts (ECTs). Of course, other use cases can easily be supported via proper selection of the corpus, and there is no requirement that the use cases relate to finance.

Let $c \in C$ represent a generic chunk of information in a corpus, and let D represent the entire corpus both for training and evaluation. For each document $d \in D$, let C(d) represent the collection of all chunks of information c in that document d. Also, let $C := \cup_{\{d \in D\}} C(d)$ represent the collection of all chunks of information c in the corpus, meaning in all documents d in the corpus. When it becomes necessary to refer to the document $d \in D$ to which a specific chunk of information $c \in C$ belongs, that document is represented by D(c). For a fixed retriever model M, let $M_q(d) = M_q(C(d))$ represent the chunks of information from document d in ascending order of distance (retrieval score) from a query q, and let $M_{q,k}(d)$ (sometimes denoted M(q,k,d)) represent a slice of the first k elements (chunks of information) in this ordered list. Evaluating one or more information retrieval (IR) metrics can be associated with metrics such as discounted cumulative gain (DCG@k), ideal discounted cumulative gain (IDCG@k), normalized discounted cumulative gain (NDCG@k), and/or mean reciprocal rank (MRR@k).

In the following discussion, example development strategies used to produce training datasets may fall into two distinct categories, which are called "document-centric" (also "chunk-centric") and "query centric." Common to both strategies is the use of triplet loss for training, validation, and hyperparameter tuning, which in some embodiments can be implemented through code modified from sentence transformers library. One example strategy for relying on triplet loss can be to source a large, diverse, and high-quality dataset or datasets of triples. In some cases, these triples may be defined as follows.

$$DS := \bigcup_q \{DS(q)\}_q = \{(q, c_{q,rel}, c_{q,irrel})\} = \{(q, c_+, c_-)\}), \quad (5)$$

$$c_+ = c_{q,rel} \text{ more relevant to } q \text{ than } c_- = c_{q,irrel}$$

Here, DS represents a dataset, $c_{q,rel}$ and $c_+$ represent a relevant chunk of information for a query q, and $c_{q,irrel}$ and $c_-$ represent an irrelevant chunk of information for the query q. The notation on the left is more complete since it explicitly denotes the dependency of the notion of relevance on the query q. The notation on the right is more concise and will generally be used from now on, taking for granted that a positive (relevant) document/chunk and a negative (irrelevant) document/chunk are considered relevant or irrelevant relative to a given query q.

One way of generating such a dataset of triples is from datasets of positive and negative pairs, such as in the following manner.

$$DS_+ = \bigcup_q \{DS_+(q)\}_q = \bigcup_{q,d} \{DS_+(q, d)\}_d \quad (6)$$

where $$DS_+(q, d) := \{(q, c_+), c_+ \in C(d)\}$$

$$DS_- = \bigcup_q \{DS_-(q)\}_q = \bigcup_{q,d} \{DS_-(q, d)\}_d$$

where $$DS_-(q, d) := \{(q, c_-), c_- \in C(d)\}$$

Here, $DS_+$ represents a dataset of positive pairs, where each pair includes a query q and a document d or chunk of information c relevant to that query q. Similarly, $DS_-$ represents a dataset of negative pairs, where each pair includes a query q and a document d or chunk of information c not relevant to that query q. After that, a dataset DS(q) for a specific query q can be formed without taking the difficulty of the negative examples into account, such as in the following manner.

$$DS(q, d) := \{q\} \times DS_+(q, d) \times DS_-(q, d) \quad (7)$$

$$DS(q) = \bigcup_d DS(q, d)$$

Note that other or more sophisticated techniques may also be used here.

One challenge that can be overcome here relates to the formation of the datasets $DS_+(q)$ and $DS_-(q)$. Of the two, it may be more challenging to mine positive examples $DS_+(q)$ in some cases. This is because it may be harder and involve more domain-specific techniques to source meaningful and "hard" positive examples in the dataset $DS_+(q)$ for a broad distribution of queries q. In contrast, once positive pairs in the dataset $DS_+(q)$ are constructed, there are generally applicable techniques for constructing irrelevant negative examples in the dataset $DS_-(q)$ for the same queries from an unlabeled corpus.

Chunk-Centric Approach for Training Data Generation

Figure 4:
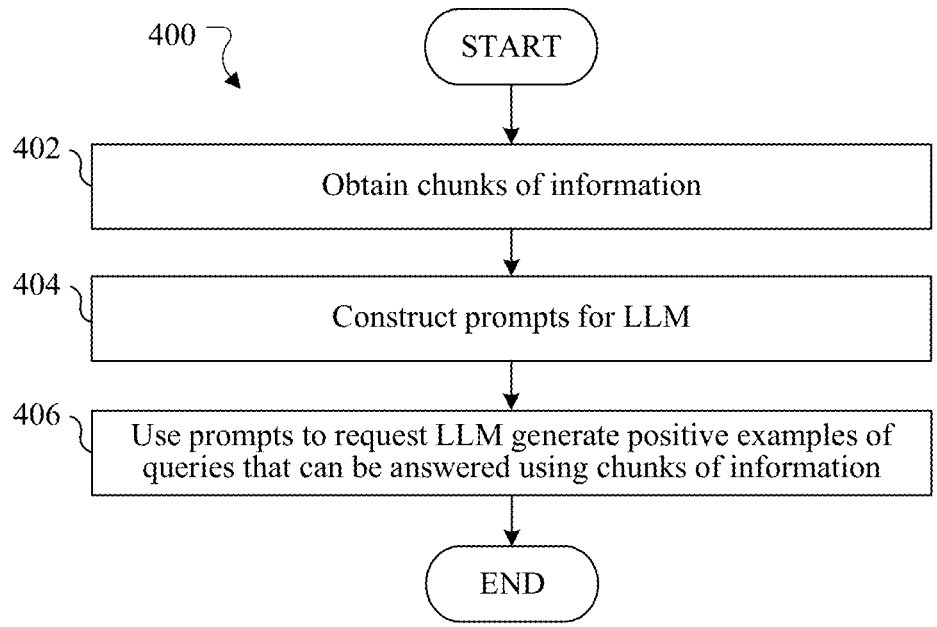
FIGS. 4 and 5 illustrate an example implementation of a chunk-based dataset generation according to this disclosure.
Figure 5:
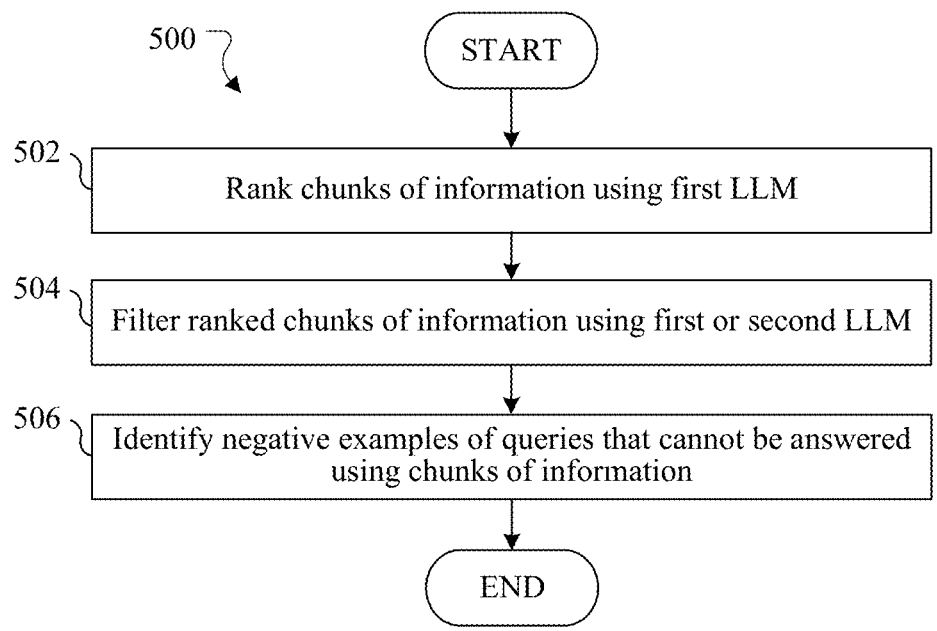

The "chunk-centric" approach for generating training datasets generally operates to produce potential input queries based on known documents d or other chunks of information c. FIGS. 4 and 5 illustrate an example implementation of a chunk-based dataset generation according to this disclosure. More specifically, FIG. 4 illustrates an example method 400 for generating positive training examples in a chunk-based training dataset, and FIG. 5 illustrates an example method 500 for generating negative training examples in a chunk-based training dataset. For ease of explanation, the methods 400 and 500 shown in FIGS. 4 and 5 are described as being performed by the application server 106 in the system 100 shown in FIG. 1, where the application server 106 is implemented using one or more instances of the device 200 shown in FIG. 2. However, the methods 400 and 500 may be performed by any other suitable device(s) and in any other suitable system(s).

As shown in FIG. 4, multiple chunks of information are obtained at step 402. This may include, for example, the processing device 202 of the application server 106 obtaining chunks of information c from various documents d or other source(s). Prompts for at least one large language model (LLM) are constructed using the chunks of information at step 404, and the prompts are used to request that one or more LLMs generate positive examples of queries that can be answered using the chunks of information at step 406. This may include, for example, the processing device 202 of the application server 106 generating prompts that request the at least one LLM generate potential input queries based on the chunks of information. As particular examples, each prompt may represent a zero-shot prompt, a one-shot prompt, or a few-shot prompt. Each prompt can request that the at least one LLM generate a potential input query that could be answered based on one of the chunks of information c provided in that prompt. Note that the chunk of information c used in each prompt here may be referred to as a "central chunk."

As shown in FIG. 5, multiple chunks of information are ranked using a first LLM at step 502. This may include, for example, the processing device 202 of the application server 106 using a first LLM to rank the relevance of various chunks of information c to each of various potential input queries q. In some cases, this can be done using a potentially "weaker" LLM. The potentially-weaker LLM may not be able to determine an answer for a query q on the basis of a relevant chunk of information c. However, the potentially-weaker LLM can make comparative judgments between chunks of information c. In other words, the potentially-weaker LLM can be used to determine which of multiple chunks of information c is more relevant or less relevant to a query q. The ranked chunks of information are filtered using the first LLM or a second LLM at step 504, and negative examples of queries that cannot be answered using the chunks of information are identified at step 506. This may include, for example, the processing device 202 of the application server 106 processing the ranked chunks of information c using the same LLM or a different LLM to remove any chunks of information c identified as being more relevant than a corresponding central chunk of information c.

Specific embodiments of the methods 400 and 500 may be implemented in the following manner. Note that the following details are examples only and do not limit the scope of this disclosure to these specific details only. To form a chunk-centric dataset, positive examples can be created by synthesizing input queries q, such as by using an LLM. For example, the LLM can be prompted with an "instruction" prompt, which asks the LLM to synthesize a query q that could be answered on the basis of a supplied chunk of information c (the central chunk). Negative examples can be created by retrieving all chunks of information c from a document d (such as by using a baseline retriever model), considering all chunks of information c appearing higher than the "central chunk" in the results as candidates, and filtering (relevant) candidates using the same LLM or a different LLM. By varying over a large number of random "central chunks" from a dataset, this can result in a large triples dataset.

One aspect of chunk-based dataset generation can be as follows. Fix a chunk of information $c \in C(D)$. Let "prompt" represent a prompt that asks an LLM to generate a "high quality" query q such that the chunk of information c is relevant to the query q. In some cases, this can be expressed as follows.

$$q = LLM(c, \text{prompt}, \text{params}) = LLM(c) \qquad (8)$$

Here, params represents one or more additional parameters being provided to the LLM or being used by the LLM to generate the high quality query q. With a prompt as just described, a chunk-centric positive example $DS_+(q)$ may be defined as follows.

$$DS_+(q) := \qquad (9)$$
$$\{(q, c_+), \text{where} = LLM(c_+, \text{prompt}, \text{params}) \text{ and filter}(q, c_+) = 1\}$$

Here, filter(·,·) is an additional binary filter function on the candidate pair $(q, c_+)$, which can be specified as described below as part of each particular implementation.

In common with many tasks given to LLMs, one factor in the quality of the results obtained from this strategy is the LLM parameters used. In some embodiments, these parameters can include the prompt and the filter function, as well as other parameters of the LLM and how to choose the chunks of information c in the above LLM generations. In order to specify a particular chunk-centric dataset, it is possible to specify these parameters as needed or desired in any given implementation.

One specific example of parameters for an LLM are as follows. Assume a GPT4 model with its default parameters, including a temperature of zero, is being used as the LLM. A prompt provided to the LLM could be a zero-shot prompt, a few-shot prompt, or a prompt using any other prompting strategy, such as chain/tree/algorithm of thoughts. The filter (·,·) function may be defined as follows.

$$\text{filter}_{k,+}(q, c) = 1 \text{ if } c \in M_{q,k}(d_c), 0 \text{ otherwise} \qquad (10)$$

Here, $d = d_c$, where $d \in D$ and $c \in C(D)$. The intuition is that the query $q := LLM(c)$ generated by the LLM may not be relevant to the chunk of information c because of some nonzero error rate of the LLM during the query-generation task. If the chunk of information c does appear within the top k results according to the retriever model M, it is possible to use C(d) as the corpus and q as the query (anchor). Usually, one uses $M = M_{baseline}$ in this filter, where $M_{baseline}$ represents a baseline filter. Previous works often use k=10 approximately. However, it has been determined that the use of this filter for this purpose may be unnecessary, as the quality of the generated queries may be adequate without filtering. However, this filter is used below for other purposes, so appropriate notation will be introduced. In effect, it is possible to think of this as using a filter with k=∞.

With respect to the choice of $c \in C_{Sample}$, the potential number of $(q, c_+) \in DS_+(q)$ (for different q depending on $c_+$) scales linearly with $|C_{Sample}|$, the linear constant being the number of distinct samples q generated from the LLM conditioned on the prompt. From a training corpus $|D_{train}| \approx 1 \times 10^5$, $C_{sample}$ could be chosen uniformly at random in some cases of size $|C_{sample}| = 4 \times 10^4$. In some embodiments, one query generation may be performed per chunk of information c. However, more sophisticated choices may be used.

Summing up the discussion of all parameters in one notation for this approach of generating the positive examples in the dataset $DS_+$, the entire document-centric process of forming positive pairs using an LLM and including the filter, showing all of the parameters that it depends on, could be expressed in the following notation.

$$DS_+(C_{sample}|LLM, M_{baseline}, k|) = \qquad (11)$$
$$\{(q, c_+)|c_+ \in C_{Sample}, q = LLM(c_+, \text{prompt}, \text{params})|\}$$

As noted above, however, this represents one specific approach for forming positive pairs using an LLM, and other approaches may be used.

One example of a few-shot prompt that may be used during the formation of a chunk-centric dataset is as follows. In this example, the number of passage-question pairs n is configurable and could be set to five in some cases. A variable "seed chunk" is the chunk given to the LLM on which to produce a relevant query.

---

"Imagine you are an analyst asking questions about an earnings call transcript. I will give you as examples, {n} passages, each immediately followed by a question which you, the analyst, might ask about an earnings call transcript, and in each case the question can be answered on the basis of the preceding passage. Finally, I will give you one more passages from the earnings call transcript. As the analyst, ask a new question which can be answered on the basis of the passage. If you, the analyst, can't think of any meaningful questions which can be answered on the basis of the passage, do not try to ask a question and output 'None'. Limit your question to 150 characters.
Example 1
<<<
Given passage: {chunk_1};
Good Question: {question_1};
Given passage: {chunk_2};

```
Good Question: {question_2} ;
...
Given passage: {chunk_n};
Good Question: {question_n} .
>>>
Given passage: {seed_chunk}
Good Question:"
```

The following are examples of passages that may be used for the n few-shot prompt, such as raw earnings call transcript (ECT) contents.

1) "As an organization, we have long had an entrepreneurial and growth mindset. Today, adding new business lines and cash flow streams that are synergistic with our already unique model. We have built the company to thrive across cycles, including uncertain environments like today, where we can seize opportunities and continue to set our business and portfolio apart. We'll now turn the call over to the operator for your questions."
2) "We returned this capital to shareholders as part of the current $5 billion share repurchase authorization. The second bar reflects our cash returns to shareholders, excluding the impact of the life and annuity sale. Together, these factors reduced capital by $5.4 billion with more than $4 billion going back to shareholders."
3) "Gross debt to trailing 12-month EBITDA was 2.6x at the end of the third quarter, while net debt to EBITDA was 2.4x. We continue to expect full year average leverage in our targeted 2.4 to 2.5x gross or 2.3 to 2.4x net ranges. Moving on to cash flow on Slide 8. Third quarter year-to-date free cash flow was negative $139 million."
4) "Debt decreased by $344 million versus 2Q '22, primarily due to net repayment of $222 million of commercial paper and a $123 million decrease in Eurobond book values caused by the strengthening dollar. Our total debt to trailing 12-month non-GAAP EBITDA ratio ended the period at 2.7x, down from 2.9x in the second quarter of 2022. During the third quarter of 2022, the company paid common stock dividends in the aggregate of $99 million."
5) "Any sense for how that might change? Do you think that's still going to be a fairly low impact? Or do you think that, that might move off? James M. Cracchiolo, Ameriprise Financial, Inc. - Chairman & CEO [55] I would say this. What we're saying is there is an increase in crediting rates and there will be as rates continue to be persistent or go up. We will make adjustments."
6) "Dori Lynn Kesten Wells Fargo Securities, LLC, Research Division - Senior Analyst * Duane Thomas Pfennigwerth Evercore ISI Institutional Equities, Research Division - Senior MD * Joseph Richard Greff JPMorgan Chase & Co, Research Division - MD * Richard J. Clarke Sanford C. Bernstein & Co., LLC., Research Division - Research Analyst *"

The following is a list of queries that could be used for the n few-shot prompt and might be based on example query styles the LLM is expected to follow.

1) What is the company strategy for growing the business?
2) What is the company Return on Assets (ROA)?
3) What are the company's leverage numbers (gross, net, target)?
4) How much did the company's debt change?
5) Does the company expect its credit ratings to change?
6) None As for negative examples in the dataset $DS_-(q)$, the following describes how the dataset $DS_-(q)$ can be set for any $q \in \pi_1(DS+)$. One example strategy here is to randomly sample some fixed number of irrelevant chunks of information $c_-$ from $C(d)=C(d_{c_+})$ for each $(q,c_+) \in DS_+(q)$. However, this strategy may have certain drawbacks in some situations. For example, the irrelevant chunks of information $c_-$ may generally be so much less relevant to a query q than the relevant chunks of information $c_+$ that the model $M=M_{baseline}$ will already correctly classify the triples $(q, c_+, c_-)$ so formed by a large margin, meaning the training process may not learn from these triples. Also, some randomly-sampled irrelevant chunks of information $c_-$ may actually be more relevant to a query q than some relevant chunks of information examples $c_+$, so their inclusion may be counterproductive. To address the first issue, in some embodiments, the irrelevant chunks of information $c_-$ could be restricted from being drawn from the results ranked higher than the relevant chunks of information $c_+$ by the baseline model. In other words, the following may be performed.

$$\text{Candidate} - DS_-(q) := q \times \{c_- \in C(d_{c_+}), M(q, c_-) < M(q, c_+)\} \quad (12)$$

To address the second issue, it is possible to set filter_$(q,c):=\neg \text{LLM}(q?\ c)$, where $\neg$ indicates a logical negation operation that maps 0 to 1 and 1 to 0. The following can also be defined.

$$DS_-(q) := \{c_- \in \text{Candidate} - DS_- \text{ where filter}\_(q, c) = 1\} \quad (13)$$

That is, a candidate chunk of information c may be retained if the LLM, when interrogated, responds that the chunk of information c is not relevant to the query q.

Note that, in some cases within the chunk-centric framework, there may be too many candidates to be evaluated with the LLM within reasonable time or while using reasonable resources. To help compensate for this, in some embodiments, a certain percentage (such as 20%) of the candidates may be randomly sampled for evaluation. The chunk-centric approach could be improved upon in various other ways.

Query-Centric Approach for Training Data Generation

The "query-centric" approach for generating training datasets generally operates to use a set of potential input queries q as a starting point and identify documents d or chunks of information c relevant to those queries q. In the following discussion, assume that D is composed of one year (four consecutive quarters) of earnings call transcripts for S&P 500 companies, such as 2022 Q3, 2022 Q4, 2023 Q1, and 2023 Q2. Also, let T represent the collection of S&P 500 tickers (companies). Because there is typically one earnings call transcript per company per quarter, the choice of (quarter, company) uniquely identifies a document $d \in D$ so that the following can be obtained.

$$D = \{d(\text{quarter}, t) \text{ with } (\text{quarter}, t) \in \text{quarters} \times T\} \quad (14)$$

Ignoring a few missing data points for now, the following can be shown.

$$|D| \approx 4 \times 500 = 2,000 \quad (15)$$

This defines the specific corpus D to be used.

The "query-centric" approach can also use a preset list of input queries. Here, let $Q_{ECT}$ represent a collection of potential input queries. In some cases, these input queries can represent high-impact user queries that may be typical or common in a given application. For the present discussion, assume that the collection of potential input queries includes the following queries. Note that there are some "noisy" instances, such as near-duplicate queries, which may or may not be used.

Example Input Queries

| | |
|---|---|
| What is the company strategy for growing the business? | Will there be any change in the company's management in the future? |
| Who is the CEO of the company? Who is the CFO of the company? | How much did the company's debt change? |
| What is the company's strategy for growing the business? | How much did the metrics reported differ from projections? |
| How is the company prioritizing deploying its cash flow? | What is the company Return on Equity (ROE)? |
| What is the company's revenue growth rate? | What is the company debt ratio? |
| What is the company revenue growth rate? | How much did the company debt change? |
| What is the company view on its future projected cash flow? | How does the company manage its foreign currency exposure? |
| What is the company's view on its future projected cash flow? | Does the company plan to restructure its debt? |
| What is the company's revenue? | Does the company expect its credit ratings to change? |
| For each of the metrics reported, what is the YoY change? | Is the company looking to secure financing? |
| Does the company expect its margins to change? | Does the company plan to issue its stocks? |
| What is the company's earnings per share? | Does the company plan to buy back bonds? |
| Does the company plan to repurchase its stocks? | What is the company operation cash flow per share? |
| Summarize discussion related to the company's debt? | What is the company quick ratio? |
| Does the company plan to issue/repurchase its stocks? | What is the company net cash flow per share? |
| Does the company plan to issue dividends? | What is the company net asset value per share? |
| Is the company open to acquire another company? | What is the company's earnings before interest, taxes, depreciation, and amortization (EBITDA) in each of its major segments? |
| What is the company's total cash? | What is the company inventory turnover? |
| What is the company's net income? | What is the company gross profit? |
| What is the company net profit? | What is the company current ratio? |
| Does the company plan to repay its outstanding debt? | What is the company account receivable turnover? |
| What are the company's leverage numbers (gross, net, target)? | What is the company Asset turnover? |
| Have there been any changes in the company's management? | How much did the revenue growth and earnings per share beat or miss the consensus? |
| What is the company's operating income? | What is the company Return on Assets (ROA)? |
| How does the company manage its foreign currency exposure? | |

In some cases, as soon as access to logs of a deployed Q&A system or other system is available, it is possible to expand this set of potential input queries, such as by mining actual queries issued by users. It is therefore possible to view $Q_{ECT}$ as a proxy for a real input query set.

In some embodiments, the queries in $Q_{ECT}$ may be chosen according to the following criterion: they should be possible to answer on the basis of a single ECT or other document d (possibly from a single contiguous passage of an ECT or other document d) and do not require aggregation or comparison of information extracted from multiple ECTs or other documents d or from multiple passages. As a result, all retrievals may be run on chunks of information c extracted from a single ECT or other document d, and a question-answer pair can be uniquely determined by a choice of a "general" $q \in Q_{ECT}$ and a specific $t \in T$. Concretely, for example, if the general query q is "What is the EPS?", each instantiation of the query q can take the form "What is the EPS of t for this quarter?" for a specific $t \in T$ and a specific value of the quarter. In some cases, the search can be carried out only over chunks of information c from document d for quarter t. Therefore, the entire space of question-answer pairs and potential retrieval tasks for a given quarter in the example above can be bounded as follows.

$$|Q_{ECT}| \times |D_{Quarter}| \approx 50 \times 500 = 25,000 \quad (16)$$

Figure 6:
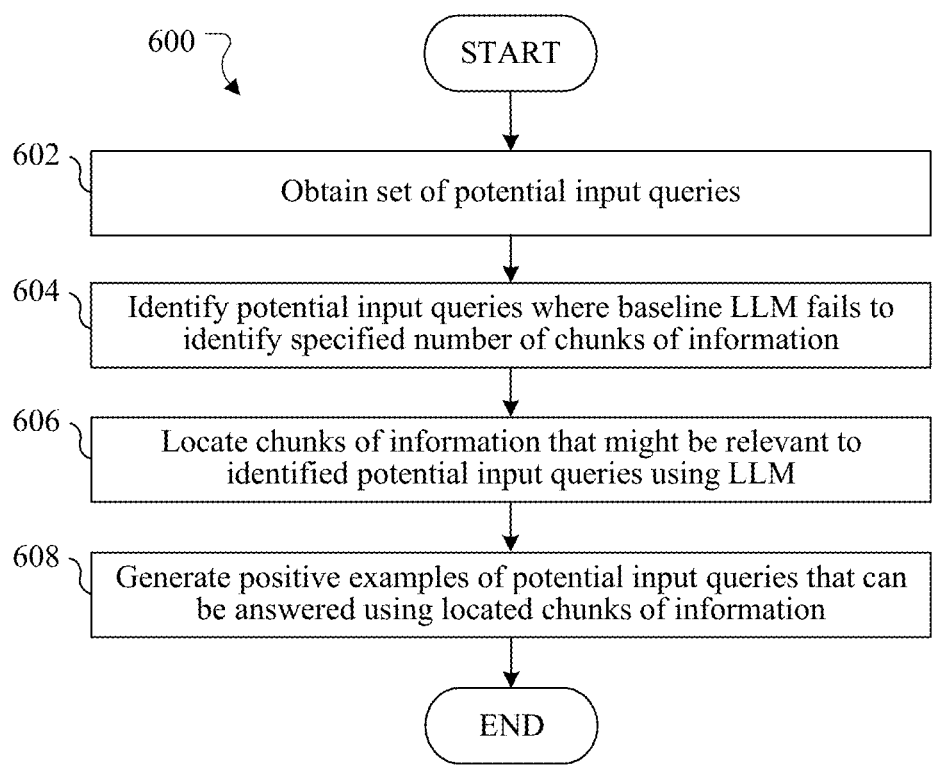
FIG. 6 illustrates an example implementation of a query-based dataset generation according to this disclosure.

FIG. 6 illustrates an example implementation of a query-based dataset generation according to this disclosure. More specifically, FIG. 6 illustrates an example method 600 for generating positive training examples in a query-based training dataset. For case of explanation, the method 600 shown in FIG. 6 is described as being performed by the application server 106 in the system 100 shown in FIG. 1, where the application server 106 is implemented using one or more instances of the device 200 shown in FIG. 2. However, the method 600 may be performed by any other suitable device(s) and in any other suitable system(s).

As shown in FIG. 6, a set of potential input queries is obtained at step 602. This may include, for example, the processing device 202 of the application server 106 obtaining a preset list or other collection $Q_{ECT}$ of queries q, such as the list of queries provided above. Potential input queries where a baseline LLM fails to identify a specified number of chunks of information are identified at step 604. This may include, for example, the processing device 202 of the application server 106 using a baseline LLM to identify a number of relevant chunks of information c for each of the potential input queries q in the collection $Q_{ECT}$ and comparing the identified number of relevant chunks of information c to a threshold value (such as three or five).

For each of the identified potential input queries, chunks of information that might be relevant to the identified potential input query are located using an LLM at step 606, and the located chunks of information are used to generate positive examples of potential input queries that can be answered using the located chunks of information at step 608. This may include, for example, the processing device 202 of the application server 106 using another LLM to search for chunks of information c that the other LLM determines are relevant to the identified potential input query q. The positive examples may include the potential input queries q and the located chunks of information c identified as being relevant to those potential input queries q.

Negative examples for a query-based dataset may be produced in any suitable manner. For example, in some cases, a method that is the same as or similar to the method 500 shown in FIG. 5 could be used to identify negative examples for the query-centric technique. Here, however, the method 500 could be performed using the positive examples produced during the method 600 rather than during the method 400.

Specific embodiments of the method 600 may be implemented in the following manner. Note that the following details are examples only and do not limit the scope of this disclosure to these specific details only. A set $Q_{ECT}$ of queries can be used as a starting point, and an LLM can be used to find, for each query $q \in Q_{ECT}$, the query-document pairs where a current baseline model "underperforms." In some cases, underperformance can be defined as failing to place any relevant chunk of information c in the top k retrieval results (such as the "top 3" retrieval results) when at least one chunk of information c exists. Positive examples can represent the relevant chunks of information c as judged by the LLM, and negative examples can be formed using similar techniques as in the "chunk-centric" technique. Note that while the chunk-centric technique may be ideal for some situations, such as those starting without any given queries q, it may be necessary or desirable to leverage $Q_{ECT}$ and find a set of positive examples (q, $c_+$) that a current baseline model $M_{baseline}$ is not retrieving within $M_{q,k}(C(d))$. The query-centric approach can offer a solution in those or other cases.

In the query-centric approach, a pair $(q,d) \in Q \times D$ is said to be in the support of a dataset DS when $d=d_{c_+}$ for some triple $(q, c_+, c_-) \in DS$, where supp(DS) represents the set of all such (q,d). In some embodiments, example designs of the query-centric dataset may satisfy the following three conditions. First, supp(DS) can be a subset of $Q_{ECT} \times D_{training}$, which can be guaranteed in certain implementations. Second, the current baseline model $M_{baseline}$ "fails" or delivers suboptimal performance on (q,d) in the sense that, letting $Rel_q(C(d))$ represent the chunks of information $c \in C(d)$ that are "ground-truth relevant" to a query q, $M_{q,k}(C(d)) \cap Rel_q(d)$ is empty but $Rel_q(d)$ is not empty. In other words, supp(DS) may be exclusively focused on a small portion of the entire space $Q_{ECT} \times D_{training}$, precisely the portion where the baseline model $M_{baseline}$ is weakest as a retriever and from which the model can learn the most. Third, the labeling of C(d) for $(q,d) \in$ supp(DS) can be exhaustive in the sense that, for (q,d) in supp(D), each $c \in C(d)$ is assigned to one of Rel(q,C(d)) (a relevant dataset) or Irrel(q,C(d)) (an irrelevant dataset). Among other things, this may enable the calculation of certain IR metrics such as IDCG and NDCG.

With respect to creating positive examples using the query-centric approach, the following describes examples of how to construct positive examples $DS_+(q)$ efficiently and with little or no user annotations in order to satisfy these three conditions. Conceptually, one way to form positive examples $DS_+(q)$ for fixed (q,d) is to use an LLM as an "oracle" source for ground truths. Thus, for instance, imagine the following scenarios.

In a first scenario, an LLM can be interrogated once for each $q \in Q$, $c \in C(d)$, and (q,c). Here, a chunk of information $c \in C(d)$ can be included in the positive examples $DS_+(q,d)$ when (i) $LLM(q?c)=1 \Leftrightarrow c \in Rel(q,C(d))$ and (ii) $LLM(q?c')=0 \Leftrightarrow c' \in Irrel(q,C(d))$ for all $c' \in M_{q,k}(C(d))$, $c' \neq c$. By definition, a dataset formed in this manner would satisfy the three conditions above. Note that if this approach is used to construct the dataset, many calls to the LLM might have to be made, such as $|Q \times C(D)|$, which may be on the order of $1 \times 10^7$ for a specified Q and corpus. One goal here may be to massively prune the search space by finding a way of cheaply identifying promising candidates. One example approach for doing so can be expressed as follows.

$$c_+ \in M_{q,>k}(d) := C(d) - M_{q,k}(C(d)) \quad (17)$$

Here, if no promising candidates are found for (q,d), (q,d) is excluded from the support of DS, and the next (q,d) is analyzed. In case some candidate $c_+$ is found, only one call for each candidate to the function LLM(q?·) may be made, which is far fewer than |C(D)| calls. Note that when a potentially-weaker LLM is used to more comparisons between two chunks of information $c_A$ and $c_B$, the following notation can be used.

$$LLM'(q?c_A:c_B) \quad (18)$$

This roughly means that the potentially-weaker LLM (denoted LLM') is asked to compare the relevance of chunks of information $c_A$ and $c_B$ to query q. In some cases, the output (after post-processing) can be "1" to indicate $c_A$, "−1" to indicate $c_B$, or "0" for a tie. As a natural extension of this, it is possible to define the following for any set of chunks of information C'.

$$LLM'(q?c_A:C') := \text{mean}_{c_B \in C'} LLM'(q?c_A:c_B) \quad (19)$$

Given that, the following can be obtained.

$$LLM'(q?c:M_{q,k}(C(d))) = \quad (20)$$
$$1 \Leftrightarrow LLM'(q?c:c') = 1 \text{ for all } c' \in M_{q,k}(C(d))$$

In a second scenario, the potentially-weaker LLM can be interrogated once for each chunk of information $c \in C(d) - M_{q,k}(C(d))$. Here, (q,c) can be included as a positive example $DS_+(q,d)$ when $LLM(q?c)=1 \Leftrightarrow c \in \text{Rel}(q,C(d))$. In the second scenario, it is not difficult to see that, under certain assumptions, the positive examples $DS_+(q,d)$ will include roughly the same set as in the first scenario. Intuitively, the explanation is that a chunk of information $c \in C(d) - M_{q,k}(C(d))$ can only be relevant, and all of $M_{q,k}(C(d))$ can be irrelevant, if it is more relevant than all chunks of information $c' \in M_{q,k}(C(d))$ and the chunk of information c is itself relevant. Unlike in the first scenario, only as many calls to the LLM as the number of $c \in C(d) - M_{q,k}(C(d))$ are needed. The following is pseudocode for an example algorithm for forming a query-centric dataset.

---

Input: $q \in Q$, $d \in D$
Output: $DS_+(q,d) \subset C(d)$
Initialize: Retrieve $M_{q,k}(C(d))=[c'_1,...,c'_k]$, ordered by rank,
LLM'(q,d,M,K,1) ← C(d), r=1
For r in 1,...,k
  If LLM'(q,d,M,K,1) is empty, break
  LLM'(q,d,M,K,1) ← {c ∈ LLM'(q,d,M,K,1)|LLM'(q : c : c'_r) = 1} (*)
Return: {c ∈ LLM'(q,d,M,K,1)|LLM(q,c) = 1}

---

Note that there are some additional optimizations that may be made in this pseudocode to decrease the number of $LLM'(q?c_A:c_B)$ evaluations to be performed. For example, to further increase efficiency, these evaluations can be highly batched.

As for negative examples $DS_-(q)$, some fixed number of irrelevant chunks of information $c_-$ can be randomly sampled from $C(d)=C(d_{c_+})$ for each $(q,c_+) \in DS_+(q)$ as described above. However, as described above, this strategy may have two drawbacks in some situations. Namely, the irrelevant chunks of information $c_-$ may generally be so much less relevant to a query q than the relevant chunks of information $c_+$ that the model $M=M_{baseline}$ will already correctly classify the triples $(q,c_+,c_-)$ so formed by a large margin, and some randomly-sampled irrelevant chunks of information $c_-$ may be more relevant to a query q than the relevant chunks of information $c_+$. To address the first issue, in some embodiments, the irrelevant chunks of information $c_-$ for the negative examples $DS_-(q)$ can be restricted to being drawn from the first k retrievals of the baseline model anchored at a query q with a corpus $C(d_{c_+})$. This can be expressed as follows.

$$\text{Candidate}_{DS_-}(q) := q \times \{c_- \in M_{q,k}(d_{c_+})\} \quad (21)$$

The second issue can be addressed in the same manner as was done in the chunk-centric technique.

Note that, in some cases within the query-centric framework, there may not be enough negative or positive examples. In those cases, the standard parameter choice k=10 for the positive example mining may be reduced, such as to k=3. This can lead to more candidates and eventually more positive examples, which in some instances may lead to more than twice as many positive examples as before. For the negative example mining in the query-centric framework, k can be increased, such as from k=3 to k=5, which in some instances may result in more than twice as many negative examples as before. The query-centric approach could be improved upon in various other ways.

Trained Retriever Model Evaluation

By using the chunk-centric technique or the query-centric technique described above, it is possible to generate training data, such as triples having the form (query, more relevant document/chunk, less relevant document/chunk). A sentence transformer 300 or other embedding model can be trained using the generated training data, and the resulting trained embedding model can be placed into use, such as when deployed to one or more other devices or otherwise placed into use as a retriever model 112.

In order to understand the effectiveness of the training based on training data generated in this manner, some estimate of what percentage of the question-answer pairs actually exist in the corpus may be needed. In the context of the earnings call transcript (ECT) example, for instance, knowledge of which (q,t) an actual answer to a query q can be found in a document d (quarter t) may be needed. In some cases, based on evaluation, this value may be about 30% and possibly somewhat less (although it can vary depending on the circumstances and the use case). Thus, in one example, there may only be about 8,000 "useful" query-document pairs per quarter (out of a possible 25,000 documents) on which to evaluate the retrieval system and no simple way to tell beforehand when a query-document pair will be "useful," meaning it contains an answer to a query q. Also, the distribution of useful query-document pairs over queries q can be very non-uniform, with some queries q having answers within most documents d and other queries q having answers within just a handful of documents d per quarter t. The sparse and non-uniform distribution of useful query-document pairs can impose a limitation on the current round of dataset formation/evaluation, which is one example motivation for the second evaluation technique described below.

Beyond the fundamental properties and limitations of the dataset, the chunking method can also be specified, where the chunking method defines how documents d are divided into chunks of information c. In some embodiments, chunking can be carried out with a spaCy NLP library. Also, in some cases, the chunking method can be used to produce chunks of information c having a length no larger than a certain number of characters within the constraints of respecting sentence boundaries or (if that is not feasible) word boundaries. As a particular example, the maximum number of characters per chunk of information c could be set to 450 characters. Empirically, this method may result in each ECT being approximately 200-300 chunks long, which would theoretically give around $1 \times 10^5$ chunks for each quarter. Because of some missing data, the results in one specific example may be closer to around $4 \times 10^4$ chunks per quarter. Note that it is assumed below a fixed chunk size is used, although varying the chunk size can be analyzed to determine if a different chunk size might be beneficial in particular implementations. Based on the ECT example above, a thorough evaluation of the performance of any retriever model M on one quarter's worth of raw data can amount to the retrieval of approximately 25,000 lists $M_{q,k}(d)$, as the query q ranges over 50 possibilities and the document d ranges over 500 possibilities, and the evaluation of one or more IR metrics such as DCG@k, NDCG@k, and MRR on each.

As noted above, the retrieval step itself can be carried out very efficiently, but challenges to accomplishing this evaluation at scale may include the following. First, the corpus can be unlabeled, and there may be little or no resources for annotation and no user engagement data. Computations of IR metrics typically assume a ground truth relevance judgment for each chunk of information c, which may not be immediately available. As described above, this challenge can be overcome to some extent using LLMs. While applying LLMs to many different retrieval sets can become time- and resource-consuming, ways of optimizing the application of LLMs have been provided above. Second, even assuming the availability of some method to label the top k documents with $M_{q,k}(d)$, there is no way of knowing if any relevant chunks have been missed. For example, when no relevant chunks are retrieved within the top k set, there may be no way of knowing if the query q has an answer in document d without having a LLM examine each chunk of information e in the document d. Creative ways of leveraging less-powerful but still-capable LLMs have been described above to avoid doing this while having (approximately) the same effect. Third, in addition to the sparsity of question-document pairs with definite answers, the question-answer pairs on which any two "near" state-of-the-art models are likely to differ significantly in retrieval performance is even sparser in the space of total question-answer pairs. Thus, a totally-exhaustive (or even random) evaluation method is likely to be wasteful of time and resources, and a more effective strategy is to focus on query/document pairs with stark differences was described above.

Various sentence transformers or other models can be used to generate embeddings, and the models can be used to generate accurate vector representations of words or sentences that can be used for a variety of tasks. Both open-source models of different sizes and commercially-available (proprietary) models could potentially be used here, allowing for a comprehensive analysis of the available embedding models. In some cases, when performing a comprehensive analysis, models can be chosen in order to include (i) models achieving state-of-the-art performance, (ii) models with different architectures, (iii) models with a large range of model sizes, and/or (iv) models that include both open-source and commercially-available models. Specific examples of embeddings models that might be evaluated could include the following: the current stable version of the textembedding-gecko@001 model provided by GOOGLE Vertex AI; OPENAI Ada embedding models like the text-embeddings-ada-002 model; instructor models like instructor-base, instructor-large, and instructor-xl models; and GTE models like the GTE-small, GTE-base, and GTE-large models. Any or all of these models may be trained using one or more training datasets generated as described above and used as a retriever model 112 with one or more generative models 114. Of course, any other or additional models may be evaluated or used here.

Various techniques may be used to evaluate the performance of a trained retriever model 112, such as for comparison to the performance of one or more other trained retriever models 112. In the following discussion, two different evaluation techniques are described, which are referred to as a "query-centric" technique and a "model-centric" technique. In some cases, both evaluation techniques keep the corpora for training and evaluation separate, and the entire corpus for training is prior to the entire corpus for testing in keeping with usual best practices in IR (although neither condition is necessarily required). Using the earnings call transcripts example above, the particular choice of the training corpus and the test corpus used to achieve this may be defined as follows.

$$D_{train} = D(2022\ Q3,\ 2022\ Q4,\ 2023\ Q1) \qquad (22)$$

$$D_{test} = D(2023\ Q2)$$

In addition, common to many evaluation techniques is that attention is restricted to only two models M to evaluate at one time, where one mode is designated as the baseline model $M_{baseline}$ and the other model is designated as the experimental model $M_{exp}$ (sometimes referred to as a "challenger" model). This helps in various ways with computational complexity.

Query-Centric Approach for Model Evaluation

Figure 7:
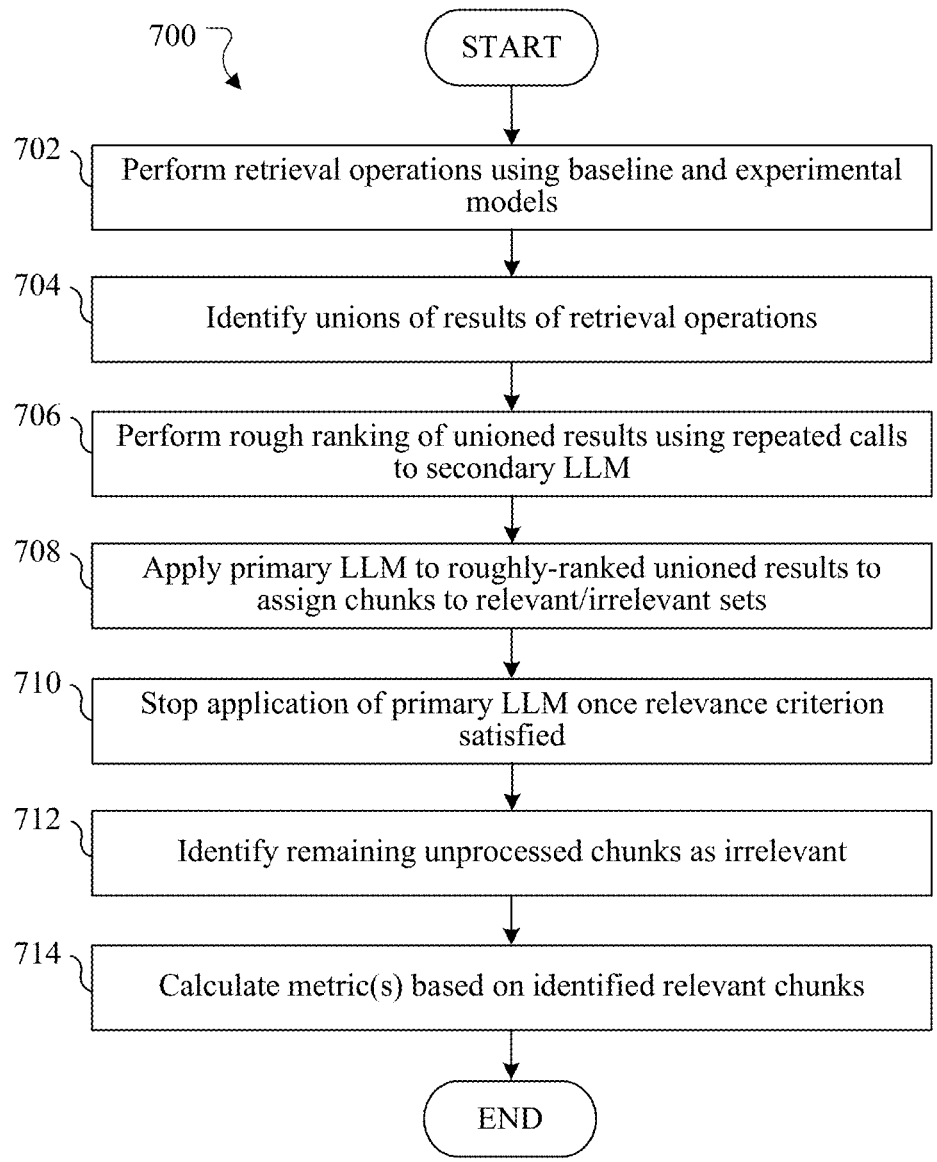
FIG. 7 illustrates an example implementation of a query-centric technique to evaluate the performance of a trained embedding model according to this disclosure.

A "query-centric" evaluation of a model can generally involve evaluating the performance of the model by performing a large number of retrievals using the model based on a large number of input queries and evaluating the retrieval results. FIG. 7 illustrates an example implementation of a query-centric technique to evaluate the performance of a trained embedding model according to this disclosure. More specifically, FIG. 7 illustrates an example method 700 for evaluating the performance of a retriever model 112 using a query-centric evaluation technique. For ease of explanation, the method 700 shown in FIG. 7 is described as being performed by the application server 106 in the system 100 shown in FIG. 1, where the application server 106 is implemented using one or more instances of the device 200 shown in FIG. 2. However, the method 700 may be performed by any other suitable device(s) and in any other suitable system(s).

As shown in FIG. 7, retrieval operations are performed using a baseline retriever model and an experimental retriever model at step 702. This may include, for example, the processing device 202 of the application server 106 obtaining chunks of information c from various documents d using a baseline model $M_{baseline}$ and an experimental model $M_{exp}$. Each model can be used to identify the top k chunks of information c contained in the documents d in response to different queries q. Unions of the retrieval results are identified at step 704. This may include, for example, the processing device 202 of the application server 106 determining, for each query q, all of the chunks of information c identified by the baseline model $M_{baseline}$ and/or the experimental model $M_{exp}$ in response to that query q.

A secondary LLM is used to perform a rough ranking of the unioned results at step 706. This may include, for example, the processing device 202 of the application server 106 using a potentially-weaker LLM to compare the relevance of different pairs of identified chunks of information c for each query q. This can effectively divide the unioned retrieval results into levels or rungs, such as five rungs. The highest rung can be associated with maximum relevance, while the lowest rung can be associated with minimal relevance. This can be said to result in a partial ordering of the unioned retrieval results.

A primary LLM is applied to the roughly-ranked unioned results in order to assign the chunks of information to relevant/irrelevant sets at step 708. This may include, for example, the processing device 202 of the application server 106 querying the primary LLM by asking whether each chunk of information c in a rung is relevant to a given query q. The primary LLM may respond by indicating that each specified chunk of information c is or is not relevant to a given query q. Note that this can start with the chunks of information c in the highest rung and work downward. This process can continue until some relevance criterion is satisfied, at which point the process can stop at step 710 and any remaining unprocessed chunks of information can be classified as irrelevant at step 712. This may include, for example, the processing device 202 of the application server 106 detecting that a rung of the unioned retrieval results contains no relevant chunks of information c, at which point it may be assumed that all lower rungs also contain no relevant chunks of information c.

One or more metrics can be generated for the baseline and experimental models based on the chunks of information identified as being relevant at step 714. This may include, for example, the processing device 202 of the application server 106 calculating one or more metrics for the baseline model $M_{baseline}$ and the experimental model $M_{exp}$. In some cases, a difference between a metric for the experimental model $M_{exp}$ and a metric for the baseline model $M_{baseline}$ can be divided by the metric for the baseline model $M_{baseline}$ in order to produce a normalized delta metric for the experimental model $M_{exp}$. Doing this across all experimental models can provide a mechanism for comparing the operations of the experimental models.

Specific embodiments of the method 700 may be implemented in the following manner. Note that the following details are examples only and do not limit the scope of this disclosure to these specific details only. With respect to an example of the query-centric evaluation, one direct way of evaluating the performance of a model M would be to perform a large number of retrievals and evaluate the results. That is, the model M can be used to form as many of the following ordered lists as possible.

$$M_q(C(d)), \text{ for } q \in Q_{ECT}, d \in D_{test} \tag{23}$$

One or more IR metrics (such as RR, NDCG, etc.) can be evaluated based on the results. One challenge with this strategy may be the lack of relevance ground truth labels for the documents d or equivalently the ideal ordering of the documents d in C(d) with respect to relevance to the query q. One straightforward way of using a generative performant LLM in this evaluation would be to use the LLM to label each chunk of information c∈ C(d) in terms of its (degree of) relevance to a query q. In some cases, this process can be formalized by defining a zero-shot or other instruction prompt template that asks the LLM to answer the query q on the basis of a chunk of information c, where q and c are variables that can be substituted into the template to form a concrete prompt. The prompt can also include instructions to respond with a particular word (such as "None") if the query q cannot be answered on the basis of the chunk of information c.

This approach can therefore be defined as follows. Let LLM(q,c|prompt) represent the text that the LLM generates. Also, let LLM(q?c)=0 if the response is negative and let LLM(q?c)=1 otherwise. A "negative response" is one that is just the word "None" or that contains some other expression (such as "does not provide") the LLM uses to indicate that the query q cannot be answered on the basis of the chunk of information c. In some cases, the function LLM(q?c) can be implemented by applying a simple regular expression (regex) function to the raw output LLM(q,c|prompt) of the LLM, but the details of this function may be changed depending on the precise LLM used.

As a particular example, a prompt having the following form could be created and supplied to an LLM: "You are a helpful assistant with knowledge of financial reporting. Answer the question '{q}' on the basis of the passage '{c}'. If you cannot answer the question on the basis of the passage, do not make up an answer. Instead respond with 'None'." The response from the LLM can undergo post-processing to obtain a binary decision {0, 1}, where "0" is output if the raw output from the LLM is simply "None" or contains a phrase like "passage does not provide" or "it does not provide" and a "1" is output otherwise. One possible issue with the above strategy may be that it involves $|Q|\times|C|\approx 500\times 2\times 10^5=10^8$ generations from the LLM, which may be expensive both computationally and financially, while it is known that the vast majority of the chunks of information c in C(d) are irrelevant to any given query q.

In order to evaluate the LLM on a much smaller subset of C(d), two operations may be adopted. First, it is possible to take advantage of the fact that only two retriever models 112 are being compared at the same time and that the retrieve-then-read system may likely take only a limited number of top results into account (say k=10) to restrict attention to $M_{baseline}$(q, d, k) and $M_{exp}$ (q, d, k). Although this may mean that only MRR@k and DCG@k metrics are computed, one benefit is that the number of potential relevance judgments that need to be taken for each (q,d) pair is only between k and 2k, not |C(d)|. Nevertheless, this may still represent a large number of LLM calls, such as up to $|Q|\times|D|\times 2k \approx 5\times 10^5$ in the example setting. Second, it is possible to leverage the potentially-weaker LLM, which may not be able to answer the query q on the basis of a relevant chunk of information c but which can make comparative judgments with regards to relevance. Thus, a second prompt template and LLM-based function can be formalized for re-use. The second prompt template can take variable strings q, $c_A$, $c_B$ and, when instantiated with particular passages, used to ask the potentially-weaker LLM which of chunk of information $c_A$ (passage "A") or chunk of information $c_B$ (passage "B") is more relevant to a query q. The second prompt may include instructions to the potentially-weaker LLM to output "neither" if both are equally relevant or irrelevant (tic).

This approach for using the potentially-weaker LLM may be defined as follows.

$$LLM'(q?c_A:c_B) = 1 \text{ if } LLM'(q, c_A, c_B) \text{ includes "A" and not "B";} \quad (24)$$
$$-1 \text{ if } LLM'(q, c_A, c_B) \text{ includes "B" not "A"; and 0 otherwise}$$

The union of two retrieval@k sets for the baseline and experimental models be defined as follows.

$$M_{\{b,e\},q,k} := M_{baseline,q,k}(C(d)) \cup M_{exp,q,k}(C(d)) \quad (25)$$

Note the following condition can be true here.

$$k \leq |M_{\{b,e\},q,k}| \leq 2k \quad (26)$$

One goal of the query-centric technique can be to estimate the relevance of $M_{\{b,e\},q,k}$ based on interrogating an LLM. In some embodiments, $LLM'(q?c_A:c_B)$ can be evaluated by making one evaluation of $LLM'(q?c_A:c_B)$ and one evaluation of $-LLM'(q?c_B:c_A)$ and returning a nonzero answer only if they agree, which can be done in order to correct for some observed bias of LLM' to answer "A" in preference to "B." In some embodiments, the potentially-weaker LLM may represent the GOOGLE flan-t5-xxl model, although other LLMs may be used here.

As a particular example, the prompt given to the potentially-weaker LLM may have the following form: "Given two texts 'A' and 'B', tell me which is more relevant to the query {q}: text A is '{$c_A$}', text B is '{$c_B$}'. You should not answer anything but the following: 'A', 'B', 'Both equally', or 'Neither'." The response from the potentially-weaker LLM can undergo post-processing to obtain a decision {−1, 0, 1}, where "1" is output if "A" is contained in the answer but not "B", "−1" if "B" is contained in the answer but not "A", and "0" otherwise. In some cases, it is possible to perform a consistency check by obtaining a result of LLM' ($q?c_B:c_A$) and negating the result, at which point either the common result or a "0" can be returned.

By making repeated calls to $LLM'(q?c_A:c_B)$ with $c_A, c_B$ drawn stochastically from $M_{\{b,e\},q,k}$, it is possible to partition $M_{\{b,e\},q,k}$ into n (roughly equally sized) rungs with the $n^{th}$ or highest rung denoting maximum relevance and the first or lowest rung denoting minimal relevance. LLM(q?·) can be applied to the partially-ordered chunks of information $c \in M_{\{b,e\},q,k}$, working down the rungs (such as from the 5-*rung to the 1-*rung) until some criterion is met according to which the potentially-weaker LLM can stop and declare that any remaining chunks of information c in any remaining lower rungs are irrelevant. The following goes into more detail on how this can be accomplished.

There are well-accepted techniques for efficiently extracting partial rankings from pairwise comparisons. For example, it is possible to modify the algorithm from Heckel et al., "Active Ranking from Pairwise Comparisons and the Futility of Parametric Assumptions," 2016 (which is hereby incorporated by reference in its entirety). In some cases, n (the number of rungs) can be fixed at five, as this seemed to strike a balance between computation efficiency of the grouping into rungs. However, other values for n may be used. Also, the space of the chunks of information c for which the function LLM(q?·) has to be applied can be pruned. For instance, with k=10 and n=5, there may be between two and four chunks of information c per rung, meaning $2 \leq |i-*| \leq 4$. Finally, one example of an algorithm used to assign relevance rankings to the tiered elements of $M_{\{b,e\},q,k}$ is provided below. Note that the notation used (from 5-* to 1-*) is taken from literature on "Likert" scales.

In the following algorithm, while the initial assignment of chunks of information $c \in M_{\{b,e\},q,k}$ to rungs may be imperfect, the assignment is adequate in the following sense. While working down the rungs, if a rung is encountered in which all documents d or chunks of information c are evaluated as "irrelevant" by the LLM, it can safely be assumed that all lower rungs also (most likely) include irrelevant documents d or chunks of information c. In that case, the algorithm can be terminated, and all remaining documents d or chunks of information c in lower rungs can be assigned a value of "0" (indicating irrelevance) without explicitly passing them through the LLM prompt LLM(q?·).

Given: Ordered sets of chunks $c \in M_{\{b,e\},q,k}$, from 5-* to 1-*.
i-* := {$c_{i,0},...,c_{i,j}$}. $M_{\{b,e\},q,k} = \cup_{\{i=1,...,5\}}$ (i-*).
Return: chunk_to_relevance, a mapping whose keys are $c \in M_{\{b,e\},q,k}$, and whose values belong to {0,1}.
Initialize: i=5, chunk_to_relevance={ } .
While i ≥ 1:
  Evaluate LLM(q,c) for $c \in \{c_{i,0}, ..., c_{i,j}\}$, and assign chunk_to_relevance [c] ← LLM(q,c).
  i -= 1.
  If all (LLM(q,c) == 0 for $c \in \{c_{i,0}, ..., c_{i,j}\}$) :
    break
Assign chunk_to_relevance (c) ← 0 for $\cup_{\{m=1,...,i\}}$ (m-*).

Here, the notation i-*:={$c_{i,0}, \ldots, c_{i,j}$} defines a relevance rung such that, according to the LLM, $c_{i,l}$ is more relevant that $c_{i+1,l'}$ for all l, l'. This operates to assign each chunk of information c to one of Rel(q,C(d)) or Irrel(q,C(d)) depending on the decision by the LLM, which could be expressed as follows.

$$c \in Rel(q, C(d)) \text{ if } LLM(q?·) = \quad (27)$$
$$1 \text{ and } c \in Irrel(q, C(d)) \text{ if } LLM(q?·) = 0$$

Once the relevance criterion is met, all remaining unprocessed chunks of information c may be assigned to Irrel(q, C(d)).

As noted above, the algorithm from Heckel et al. can be modified for use here. More specifically, the following hyperparameter is used in this algorithm.

$$\delta = 0.5 \text{ (tolerance of error parameter)} \quad (28)$$

Because the original algorithm is designed for a setting where outcomes of head-to-head comparisons are stochastic and outcomes of comparisons are deterministic, it may not be necessary to run the algorithm until the termination condition is met. It may also be impractical because, even with δ set to the relatively large 0.5, it may take very long to terminate. Therefore, a parameter "limit_on_f" can be used, which has the algorithm artificially terminate after t rounds. After t rounds, some rungs have free space, and these rungs are referred to as "partially empty". Some objects are already assigned to rungs, and those that are not (called "unassigned objects") have scores stored in the last row of ti. The objects that have not already been assigned to rungs (if any) can be sorted by score in descending order. Starting with the first partially empty rung, the rung can be filled with the highest-scoring unassigned objects, moving onto the next partially empty rung as soon as the current rung is filled. When this process terminates, all objects are assigned, and all rungs are filled in a way that is consistent with the assignment made by the partially completed algorithm and the scores obtained for the unassigned objects. In some embodiments, limit_on_t=5. While this may not seem like a large number of rounds, recall that each round of the algorithm involves |\mathscr{S}| comparisons, where \mathscr{S} starts out as $M_{\{b,e\},q,k}$ with a size between k=10 and 2k=20. Also, in each round, |\mathscr{S}| is the number of unassigned objects. Therefore, in practice, this parameter choice involves between approximately 50 and 100 calls to LLM(q?$c_A$:$c_B$) to make comparisons among chunks of information c in $M_{\{b,e\},q,k}$, which is enough to establish a rough partial ordering on $M_{\{b,e\},q,k}$.

Note that the above covers in detail the case of taking the mean over all query-documents or query-chunk pairs. However, the case of taking the mean over some well-defined subset is similar. Using the earnings call transcript use case as an example, the mean may be taken over all pairs where q∈$Q_{ECT}$ is fixed. In that case, it can be said that metrics are being stratified by some factor, such as by saying that "stratifying by query" is being done. When stratifying by a factor such as query, it is more frequent to have the denominator, the metric of the baseline model, be zero when normalizing a difference between the metric of the baseline model and the metric of the experimental model. In that case, the normalized delta of the metric would be undefined.

In these or other situations, the concept of "effective support" may be used. Effective support refers to the total number of query-document pairs (retrievals) for which at least one relevant chunk of information c is in $M_{\{b,e\},q,k}$, the union of the result sets for the two models being compared. More generally, for results aggregated (averaged) by query, company, or another factor, effective support is the number of query-document pairs (retrievals) out of the total that are incorporated in the aggregated statistic for which at least one relevant document is in $M_{\{b,e\},q,k}$. The terminology "effective support" comes from the fact that any query-document pair where no relevant chunks of information c are surfaced in the top k results contributes nothing useful to the measurement. This applies whether the measurement being reported is an average over all query-document pairs or query-document pairs satisfying some restriction. Thus, only the query-document pairs in the "effective support" contribute useful information to the statistic being reported.

The query-centric approach for model evaluation provides a flexible evaluation framework that can be applied for different datasets and embedding (retriever) models to evaluate and compare the performance of the models. This enables generation of a ranking of retriever models for different tasks and to efficiently benchmark new retriever models that might be considered for specific use cases. Among other things, this allows for the training and comparison of a number of open-source and commercial (proprietary) models of various sizes.

One potential issue with this evaluation approach is that there may be many queries q with insufficient or no data, meaning there may be many queries q where neither the baseline model nor the experimental model returns any relevant chunks of information c. Different approaches may be used to address this issue. For example, in some cases, the "model-centric" evaluation approach described below may be used. In other cases, given a specified query q (such as a query q in $Q_{ECT}$), the best-performing experimental model out of those evaluated so far (which may be one of the models discussed above or a fine-tuned checkpoint thereof) can be used to perform a search over the whole chunk corpus C(D) (rather than simply over distinct C(d)s for d in D) simultaneously, thus obtaining $M_{q,k}$(C(D)) for k≫10 (such as k=1000). These results can be reranked and mined for chunks of information c that are relevant to the query q. When positive results (relevant chunks of information c) for the query q are very sparse in D, this may be a more efficient method of finding the few chunks of information c relevant to the query q than iterating over individual $M_{q,k}$(C(d)) for randomly selected d∈D. There may also be ways of using domain knowledge for narrowing the search for a relevant chunk of information c for a query q to a certain document d, such as those corresponding to companies in a certain sector or of a certain market cap.

Model-Centric Approach for Model Evaluation

A "model-centric" evaluation of a model can generally involve evaluating the performance of the model by searching for query-document pairs where the model performs poorly. In some embodiments, this evaluation can be performed by conducting a stochastic search over an entire query-document space to attempt to find query-document pairs that (i) contain an answer to the query in the document and (ii) exhibit suboptimal retrieval performance for a given model (such as the experimental or baseline model). The evaluation can be carried out over the query-document pairs identified in the stochastic search. In some cases, the model-centric approach can be applied to obtain a second set of evaluation results (in addition to the query-centric approach), possibly with an effective support roughly three times the effective support of the query-centric approach and with a much larger proportion of the queries having effective support.

Figure 8:
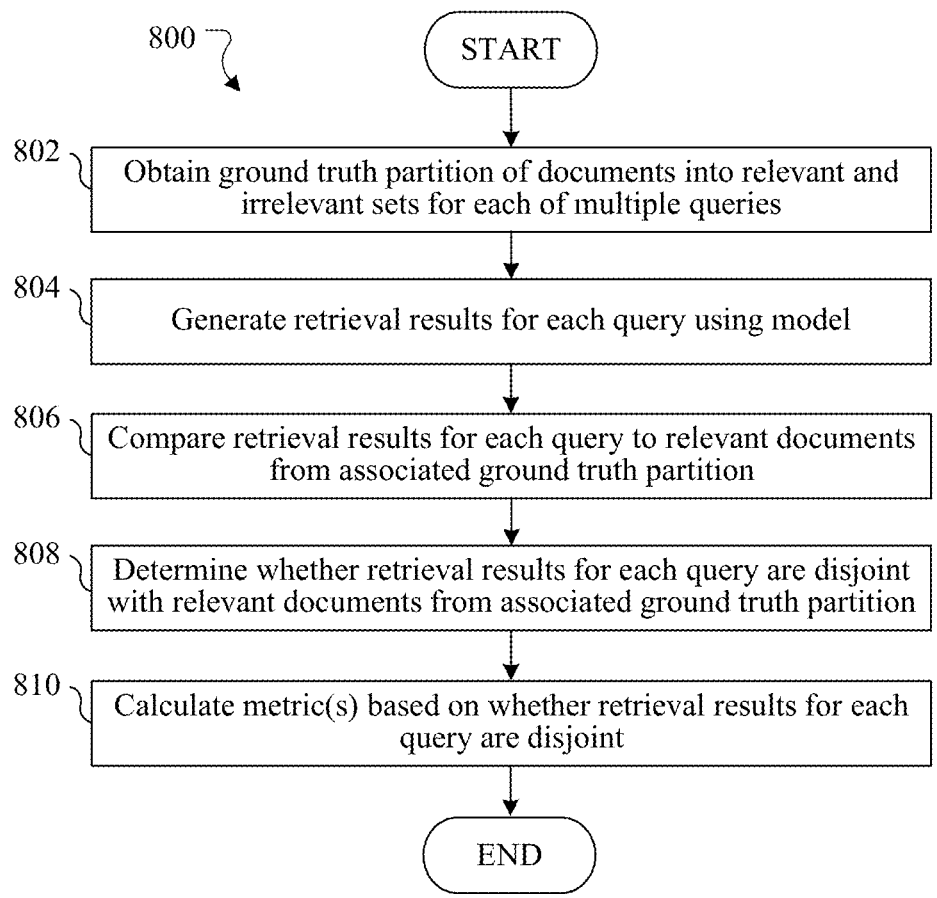
FIG. 8 illustrates an example implementation of a model-centric technique to evaluate the performance of a trained embedding model according to this disclosure.

FIG. 8 illustrates an example implementation of a model-centric technique to evaluate the performance of a trained embedding model according to this disclosure. More specifically, FIG. 8 illustrates an example method 800 for evaluating the performance of a retriever model 112 using a model-centric evaluation technique. For case of explanation, the method 800 shown in FIG. 8 is described as being performed by the application server 106 in the system 100 shown in FIG. 1, where the application server 106 is implemented using one or more instances of the device 200 shown in FIG. 2. However, the method 800 may be performed by any other suitable device(s) and in any other suitable system(s).

As shown in FIG. 8, a ground truth partition of documents into relevant and irrelevant sets for each of multiple queries is obtained at step 802. This may include, for example, the processing device 202 of the application server 106 obtaining an identification of which documents d are and are not relevant to various input queries q. Retrieval results are generated for each query using a model being evaluated at step 804. This may include, for example, the processing device 202 of the application server 106 using a retriever model 112 to obtain a set of k documents d deemed by the retriever model 112 to be most relevant for each query q.

The retrieval results for each query are compared to relevant documents from the associated ground truth partition at step 806. This may include, for example, the processing device 202 of the application server 106 determining whether any of the set of k documents d deemed by the retriever model 112 to be most relevant for each query q also appear among the documents d identified by the associated ground truth partition as being relevant. A determination is made whether the retrieval results for each query are disjoint with the relevant documents from the associated ground truth partition at step 808. This may include, for example, the processing device 202 of the application server 106 determining if there are any queries q where the retriever model 112 identified a set of k documents d in which none of those documents d is actually relevant. One or more metrics can be generated for the model based on whether the model generates retrieval results that are disjoint from the ground truth partitions at step 810. This may include, for example, the processing device 202 of the application server 106 calculating one or more metrics for the model and potentially normalizing each metric. Doing this across all experimental models can provide a mechanism for comparing the operations of the experimental models.

Specific embodiments of the method 800 may be implemented in the following manner. Note that the following details are examples only and do not limit the scope of this disclosure to these specific details only. With respect to an example of the model-centric evaluation, assume there is a ground truth partition $C(d)=Rel(q,C(d)) \cup Irrel(q,C(d))$ of $C(d)$ into relevant and irrelevant documents d for each query q. A retriever model M may be thought of as underperforming for (q,d) provided that $Rel(q,C(d))$ is nonempty but disjoint from $M_{q,k}(d)$, meaning the retriever model M retrieves none of the documents d that are actually relevant within its top k results.

The model-centric evaluation may therefore occur as follows. For each (q,d) E $Supp(DS_+)$ for a query-centric dataset, define $Rel(q,C(d))$ as the relevant chunks of information C+such that $(q,c_+) \in DS_+(q)$, and define $Irrel(q,C(d))$: =$C(d)-Rel(q,C(d))$. Thus, by definition, the following can be obtained.

$$C(d) = Rel(q, C(d)) \cup Irrel(q, C(d)) \quad (29)$$

This a disjoint union, and the model M is underperforming in (q,d) in these circumstances. Because there is already an implicit ground truth labeling of $(q,d) \in Supp(DS+)$, calculation of all IR metrics (including NDCG) can be performed efficiently on each $(q,d) \in Supp(DS+)$ as soon as retrieval is performed to form $M_{baseline,q,k}(d)$ and $M_{exp,q,k}(d)$.

Depending on the implementation, example potential advantages of model-centric evaluation versus query-centric evaluation may include the following. The model-centric evaluation can be adapted precisely to report on the (q,d) pairs in the potential test space where a model M is known to behave poorly in the sense that there are relevant chunks of information $c \in C(d)$ but none are retrieved in $M_{q,k}(C(d))$, which represents the top k search results under the model M. Taking inclusion in $LLM'(q,d,M,k,1)$ as a proxy for relevance, IDCG and hence NDCG can be calculated because the entire C(d) is labeled for relevance to the query q.

Also, depending on the implementation, example potential disadvantages of model-centric evaluation versus query-centric evaluation may include the following. The set of (q,d) satisfying (*) may be sparse and may not be directly under control, although it is controllable in size through the parameter k. Moreover, taking $M=M_{baseline}$, which is the easiest option because it makes re-use of all computations done in deriving the query-centric dataset, may not be a sound option because the results can be biased against $M_{baseline}$ and biased towards $M_{exp}$ (the flip side of the first advantage above). In addition, calculating separate metrics by taking $M=M_{baseline}$ and taking $M=M_{exp}$ is a more unbiased approach, but this raises additional complexity since (i) positive example mining may need to be done separately for each embedding (retriever) model and (ii) it may not be simple to combine the two separate metrics obtained into one single metric comparing $M_{baseline}$ against $M_{exp}$.

Even with various optimizations and parameter choices, it may take a lengthy period to run the model-centric evaluation over all choices of (q,d). For example, using the earnings call transcript use case, it may take a lengthy period to run the model-centric evaluation over all choices of $(q,d) \in Q_{ECT} \times D(quarter)$, such as when there are approximately 25,000 combinations for each quarter. Given these types of issues, some form of a sampling scheme may be used. One form of sampling could include uniform random sampling. It may be observed empirically that if (q,d) are sampled uniformly at random from Q×D in mining positive examples, the dataset $DS_+$ may inordinately be concentrated in certain queries q for which $M_{baseline}$ is particularly poor. To impart more diversity within the dataset, an "active learning" sampling scheme may be used to sample with greater preference for queries q that retrieve less data but are not suffering from too many failures (in order to avoid wasting time either on the queries q that have adequate data already or queries q that are not likely to yield any new data).

For adaptive sampling of (ticker, query) pairs in mining positive examples, for instance, one goal can be to have roughly the same number of unique tickers represented in the positive set for each query q, regardless of how many chunks of information c are positive for the (ticker, query) pair. This process can be viewed as attempting to sample from |Q| (such as about 50) categories/queries, where each attempt to sample from a query/category has an unknown failure rate. This may be done to collect a final sample that is as balanced as possible in |Q| number of categories.

As an example of this, let the total number of samples to be collected be D, and let the total number of samples desired to be collected in each category be D/|Q|. Let C be the vector of counts of successful samples from each category (of length |Q|). At this point, consider iteratively sampling from the $i^{th}$ category with (unnormalized) probability $(1-C\_i/(D/|Q|))$, which can be 1 for any category for which there are currently no samples and tending to 0 as the number of samples of the category accumulates to D/|Q|. Normalization of the unnormalized probabilities may be achieved, such as by dividing the values above by their sum over i at any time step. In some cases, these probabilities may need adjustment if some categories have very high natural failure rates, which would be the case if, for example, certain queries have virtually no relevant passages that are not currently identified in the top k results by the current retriever model. To make the sampling procedure more robust to such circumstances, a penalty term can be included for failures so that the unnormalized probabilities now equal $(1-C\_i/(D/|Q|))/(1+\text{failures}\_i)$, where failures_i is the failure count for category i. Finally, in order to prevent any categories from being permanently skipped because of a large number of failures, the failure counts can be decayed, such as by a multiplicative factor so that they are reduced to 1% (or other negligible amount) of their "normal" value after one "notional epoch" of time steps. The "notional epoch" is defined as the number of time steps one is expected to wait, on average, when sampling uniformly from the |Q| categories. In some cases, the notional epoch may be calculated by the formula given as the solution to the "Coupon Collector's Problem" (estimation method based on Euler's constant).

Note that some implementations of the two evaluations techniques described above may only focus on a limited number of queries q (such as around 50 queries). Of those queries, evaluation may be heavily weighted towards a subset of the queries q for which the most data is available, meaning the evaluations may be naturally biased towards this subset of queries q. This may explain why models trained on a query-centered dataset may have higher performance since (i) they can be formed using the same queries q and (ii) it may be more likely that the "best" model is actually overfitting to those queries q. In order to correct for this, it is possible to expand both the training and evaluation sets to a larger number and more diverse set of queries q. Several strategies may be used for this, such as mining for more documents d in the corpus that contain answers to "tail" queries q (those with small effective support). It is also possible to run the entire pipeline on a larger set of queries q, such as those originating from users of a deployed system once the system is deployed and this data becomes available.

Also note that it has been assumed above that the size of the chunks of information c is fixed to one chunk size. However, it is possible to perform simultaneous chunking of the same underlying context (documents d) with different chunk size parameters. This allows the benefits (if any) of fine-tuning a model on a chunked corpus of multiple sizes and retrieving from the same chunked corpus using different parameters to be explored. In addition, note that the triples dataset(s) can be used to train or fine-tune other machine learning models, such as a cross-encoder re-ranker. This can be done to improve the end-to-end performance of an information retrieval system, and an efficient "tuned" cross-encoder may be as significant as the embedding model for efficient retrieval.

Regardless of the exact performance of the models trained as described above, the techniques described above provide a software framework for (i) automated evaluation of dense retriever models, (ii) formation of novel training datasets for relevance embedding models, and (ii) retraining of embeddings models for relevance retrieval. With some refactoring of the software, it is possible to apply this framework to many other corpora and problem domains for retrieval-augmented generation in AI.

Although FIGS. 4 through 8 illustrate examples of implementations of dataset generation and embedding model evaluation, various changes may be made to FIGS. 4 through 8. For example, while each figure shows a series of steps, various steps in each figure may overlap, occur in parallel, occur in a different order, or occur any number of times.

Example Processes

Figure 9:
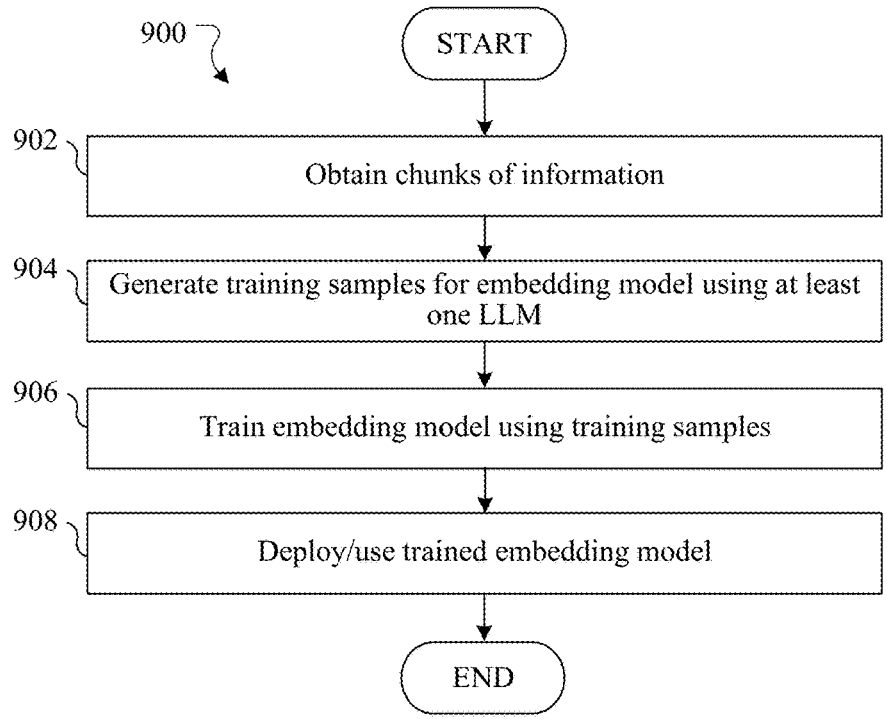
FIG. 9 illustrates an example method for data generation and retraining techniques for fine-tuning of embedding models for efficient data retrieval according to this disclosure.

FIG. 9 illustrates an example method 900 for data generation and retraining techniques for fine-tuning of embedding models for efficient data retrieval according to this disclosure. For case of explanation, the method 900 shown in FIG. 9 is described as being performed by the application server 106 in the system 100 shown in FIG. 1, where the application server 106 is implemented using one or more instances of the device 200 shown in FIG. 2. However, the method 900 may be performed by any other suitable device(s) and in any other suitable system(s).

As shown in FIG. 9, chunks of information are obtained at step 902. This may include, for example, the processing device 202 of the application server 106 obtaining chunks of information c from various documents d or other source(s). Any suitable number of chunks of information c may be obtained here. Training samples for an embedding model are generated using at least one LLM based on the chunks of information at step 904. This may include, for example, the processing device 202 of the application server 106 using the chunk-based dataset generation technique and/or the query-based dataset generation technique described above. In some cases, the training samples can include triples having the form (query, more relevant document/chunk, less relevant document/chunk).

The embedding model is trained using the training samples at step 906. This may include, for example, the processing device 202 of the application server 106 using the training samples to train a sentence transformer 300 or another embedding model. There are various techniques known for training machine learning models, and additional techniques are sure to be developed in the future. Any suitable technique or techniques may be used here, and this disclosure is not limited to any specific training technique. The training may optionally include using the query-centric technique and/or the model-centric technique for model evaluation to determine how well the trained embedding model appears to operate. The trained embedding model can be deployed or placed into use, such as for inferencing, at step 908. This may include, for example, the processing device 202 of the application server 106 providing the trained embedding model as a retriever model 112 for use by the application server 106 or one or more other devices.

Although FIG. 9 illustrates one example of a method 900 for data generation and retraining techniques for fine-tuning of embedding models for efficient data retrieval, various changes may be made to FIG. 9. For instance, while shown as a series of steps, various steps in FIG. 9 may overlap, occur in parallel, occur in a different order, or occur any number of times. Also, at least some of the steps in the method 900 may be performed any number of times to train any number of embedding models.

Figure 10:
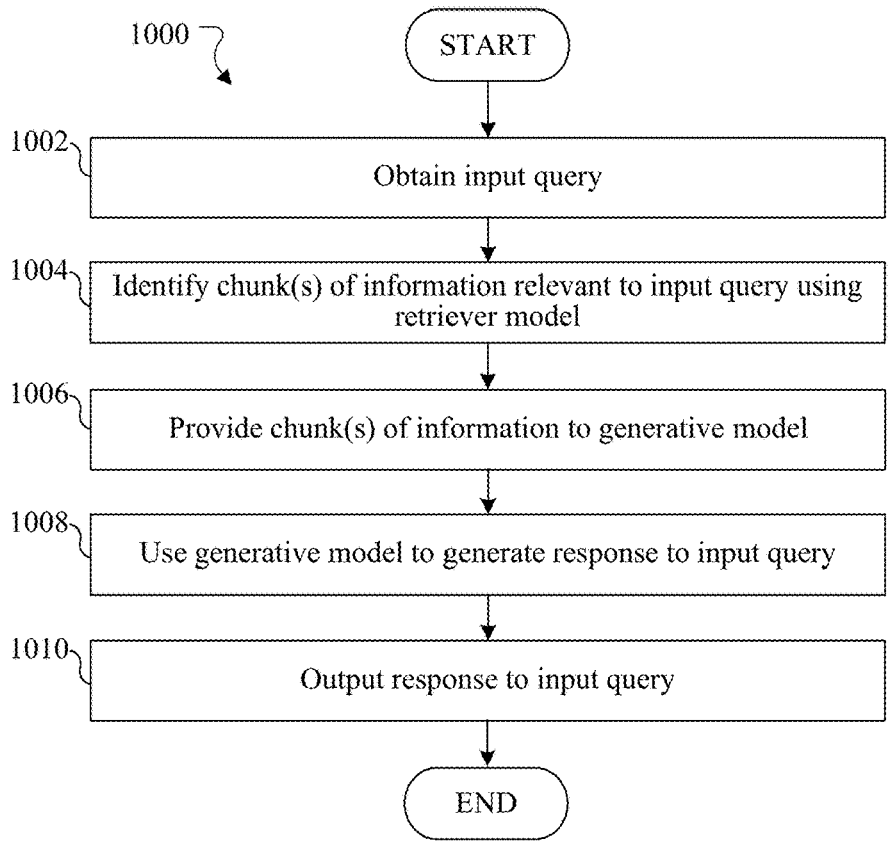
FIG. 10 illustrates an example method for using fine-tuned embedding models for efficient data retrieval according to this disclosure.

FIG. 10 illustrates an example method 1000 for using fine-tuned embedding models for efficient data retrieval according to this disclosure. For case of explanation, the method 1000 shown in FIG. 10 is described as being performed by the application server 106 in the system 100 shown in FIG. 1, where the application server 106 is implemented using one or more instances of the device 200 shown in FIG. 2. However, the method 1000 may be performed by any other suitable device(s) and in any other suitable system(s).

As shown in FIG. 10, an input query is obtained at step 1002. This may include, for example, the processing device 202 of the application server 106 obtaining a user query from a user of a user device 102a-102d or other input query. The input query may have any suitable form, such as a natural language query. One or more chunks of information relevant to the input query are identified at step 1004. This may include, for example, the processing device 202 of the application server 106 using a retriever model 112 (which may include or represent an embedding model trained in accordance with the method 900 of FIG. 9) to identify one or more chunks of information relevant to the input query.

The one or more chunks of information are provided to a generative model at step 1006. This may include, for example, the processing device 202 of the application server 106 generating a prompt that includes or is based on the input query and the identified chunk(s) of information. The generative model is used to generate a response to the input query at step 1008. This may include, for example, the processing device 202 of the application server 106 providing the prompt to the generative model 114. This may also include the generative model 114 using the identified chunk(s) of information in the prompt as context when generating the response to the input query. The response to the input query is output at step 1010. This may include, for example, the processing device 202 of the application server 106 providing the response to the user device 102a-102d for presentation to at least one user.

Although FIG. 10 illustrates one example of a method 1000 for using fine-tuned embedding models for efficient data retrieval, various changes may be made to FIG. 10. For instance, while shown as a series of steps, various steps in FIG. 10 may overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112 (f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112 (f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    obtaining chunks of information;
    generating training samples for an embedding model using the chunks of information, wherein generating the training samples comprises using prompting at least one first large language model to generate training samples in which different ones of the chunks of information are and are not relevant to different potential queries, wherein the training samples are related to a specified domain;
    training the embedding model using the training samples; and
    evaluating the trained embedding model;
    wherein each of the training samples comprises a triple containing (i) a specified potential query within the specified domain, (ii) a chunk of information that is more relevant to the specified potential query, and (iii) a chunk of information that is less relevant or not relevant to the specified potential query;
    wherein the embedding model is trained using the training samples such that the embedding model is fine-tuned to be able to identify chunks of information within the specified domain that are relevant to input queries for processing by a generative model, the triples enabling the embedding model to learn during training to differentiate between the chunks of information within the specified domain that are relevant to the input queries and chunks of information within the specified domain that are not relevant to the input queries; and
    wherein evaluating the trained embedding model comprises performing retrieval operations using a baseline retriever model and an experimental retriever model comprising the trained embedding model, ranking results of the retrieval operations into multiple rungs based on relevance using at least one second large language model, and using the at least one first large language model to identify relevant results in the rungs in order of decreasing relevance until a rung with no relevant results is identified.

2. The method of claim 1, wherein prompting the at least one first large language model to generate the training samples comprises:
providing the chunks of information to the at least one first large language model with requests to generate the potential queries based on the chunks of information; and
prompting the at least one first large language model to generate positive examples of potential queries in which the potential queries are answerable using the chunks of information.

3. The method of claim 1, wherein prompting the at least one first large language model to generate the training samples comprises:
prompting a specified large language model to rank the chunks of information in response to the potential queries; and
filtering out relevant chunks of information using the specified large language model or another specified large language model to identify negative examples of potential queries in which the potential queries are not answerable using remaining chunks of information.

4. The method of claim 1, wherein prompting the at least one first large language model to generate the training samples comprises:
obtaining a set of the potential queries;
for each of at least a subset of the potential queries, prompting the at least one first large language model to locate chunks of information that might be relevant to the potential query; and
using the located chunks of information to generate positive examples of potential queries in which the potential queries are answerable using the located chunks of information.

5. The method of claim 4, wherein each of the potential queries in the subset is identified in response to a baseline large language model failing to identify a specified number of chunks of information for that potential query.

6. The method of claim 1, wherein the embedding model is configured to provide up to a specified number of the chunks of information to the generative model.

7. A method comprising:
obtaining an input query at a retriever model, the retriever model configured to identify a specified number of chunks of information relevant to the input query;
providing one or more of the chunks of information from the retriever model to a generative model; and
prompting the generative model to create a response to the input query, the response based on the one or more chunks of information;
wherein the retriever model is trained by:
obtaining training chunks of information;
generating training samples for an embedding model using the training chunks of information, wherein generating the training samples comprises prompting at least one first large language model to generate training samples in which different ones of the training chunks of information are and are not relevant to different potential queries, wherein the training samples are related to a specified domain;
training the embedding model using the training samples, wherein the retriever model comprises the trained embedding model; and
evaluating the trained embedding model;
wherein each of the training samples comprises a triple containing (i) a specified potential query within the specified domain, (ii) a chunk of information that is more relevant to the specified potential query, and (iii) a chunk of information that is less relevant or not relevant to the specified potential query;
wherein the embedding model is trained using the training samples such that the embedding model is fine-tuned to be able to identify the specified number of chunks of information within the specified domain that are relevant to the input query for processing by the generative model, the triples enabling the embedding model to learn during training to differentiate between the chunks of information within the specified domain that are relevant to the input query and chunks of information within the specified domain that are not relevant to the input query; and
wherein evaluating the trained embedding model comprises performing retrieval operations using a baseline retriever model and the retriever model comprising the trained embedding model, ranking results of the retrieval operations into multiple rungs based on relevance using at least one second large language model, and using the at least one first large language model to identify relevant results in the rungs in order of decreasing relevance until a rung with no relevant results is identified.

8. An apparatus comprising:
at least one processing device configured to:
obtain chunks of information;
generate training samples for an embedding model using the chunks of information, wherein, to generate the training samples, the at least one processing device is configured to prompt at least one first large language model to generate training samples in which different ones of the chunks of information are and are not relevant to different potential queries, wherein the training samples are related to a specified domain;
train the embedding model using the training samples; and
evaluate the trained embedding model;
wherein each of the training samples comprises a triple containing (i) a specified potential query within the specified domain, (ii) a chunk of information that is more relevant to the specified potential query, and (iii) a chunk of information that is less relevant or not relevant to the specified potential query;
wherein the at least one processing device is configured to train the embedding model using the training samples such that the embedding model is fine-tuned to be able to identify chunks of information within the specified domain that are relevant to input queries for processing by a generative model, the triples enabling the embedding model to learn during training to differentiate between the chunks of information within the specified domain that are relevant to the input queries and chunks of information within the specified domain that are not relevant to the input queries; and
wherein, to evaluate the trained embedding model, the at least one processing device is configured to perform retrieval operations using a baseline retriever model and an experimental retriever model comprising the trained embedding model, rank results of the retrieval operations into multiple rungs based on relevance using at least one second large language model, and use the at least one first large language model to identify relevant results in the rungs in order of decreasing relevance until a rung with no relevant results is identified.

9. The apparatus of claim 8, wherein, to prompt the at least one first large language model to generate the training samples, the at least one processing device is configured to:
provide the chunks of information to the at least one first large language model with requests to generate the potential queries based on the chunks of information; and
prompt the at least one first large language model to generate positive examples of potential queries in which the potential queries are answerable using the chunks of information.

10. The apparatus of claim 8, wherein, to prompt the at least one first large language model to generate the training samples, the at least one processing device is configured to:
prompt a specified large language model to rank the chunks of information in response to the potential queries; and
filter out relevant chunks of information using the specified large language model or another specified large language model to identify negative examples of potential queries in which the potential queries are not answerable using remaining chunks of information.

11. The apparatus of claim 8, wherein, to prompt the at least one first large language model to generate the training samples, the at least one processing device is configured to:
obtain a set of the potential queries;
for each of at least a subset of the potential queries, prompt the at least one first large language model to locate chunks of information that might be relevant to the potential query; and
use the located chunks of information to generate positive examples of potential queries in which the potential queries are answerable using the located chunks of information.

12. The apparatus of claim 11, wherein the at least one processing device is configured to identify each of the potential queries in the subset in response to a baseline large language model failing to identify a specified number of chunks of information for that potential query.

13. The apparatus of claim 8, wherein the embedding model is configured to provide up to a specified number of the chunks of information to the generative model.

14. The apparatus of claim 8, wherein the at least one processing device is further configured to:
provide an input query to a deployed retriever model comprising the trained embedding model, the deployed retriever model configured to identify a specified number of chunks of information relevant to the input query;
provide one or more of the specified number of chunks of information from the deployed retriever model to the generative model; and
prompt the generative model to create a response to the input query, the response based on the one or more of the specified number of chunks of information.

15. A non-transitory computer readable medium containing instructions that when executed cause at least one processor to:
obtain chunks of information;
generate training samples for an embedding model using the chunks of information, wherein the instructions that when executed cause the at least one processor to generate the training samples comprise instructions that when executed cause the at least one processor to
prompt at least one first large language model to generate training samples in which different ones of the chunks of information are and are not relevant to different potential queries, wherein the training samples are related to a specified domain;
train the embedding model using the training samples; and
evaluate the trained embedding model;
wherein each of the training samples comprises a triple containing (i) a specified potential query within the specified domain, (ii) a chunk of information that is more relevant to the specified potential query, and (iii) a chunk of information that is less relevant or not relevant to the specified potential query;
wherein the instructions when executed cause the at least one processor to train the embedding model using the training samples such that the embedding model is fine-tuned to be able to identify chunks of information within the specified domain that are relevant to input queries for processing by a generative model, the triples enabling the embedding model to learn during training to differentiate between the chunks of information within the specified domain that are relevant to the input queries and chunks of information within the specified domain that are not relevant to the input queries; and
wherein the instructions that when executed cause the at least one processor to evaluate the trained embedding model comprise instructions that when executed cause the at least one processor to perform retrieval operations using a baseline retriever model and an experimental retriever model comprising the trained embedding model, rank results of the retrieval operations into multiple rungs based on relevance using at least one second large language model, and use the at least one first large language model to identify relevant results in the rungs in order of decreasing relevance until a rung with no relevant results is identified.

16. The non-transitory computer readable medium of claim 15, wherein the instructions that when executed cause the at least one processor to prompt the at least one first large language model to generate the training samples comprise:
instructions that when executed cause the at least one processor to:
provide the chunks of information to the at least one first large language model with requests to generate the potential queries based on the chunks of information; and
prompt the at least one first large language model to generate positive examples of potential queries in which the potential queries are answerable using the chunks of information.

17. The non-transitory computer readable medium of claim 15, wherein the instructions that when executed cause the at least one processor to prompt the at least one first large language model to generate the training samples comprise:
instructions that when executed cause the at least one processor to:
prompt a specified large language model to rank the chunks of information in response to the potential queries; and
filter out relevant chunks of information using the specified large language model or another specified large language model to identify negative examples of potential queries in which the potential queries are not answerable using remaining chunks of information.

18. The non-transitory computer readable medium of claim 15, wherein the instructions that when executed cause the at least one processor to prompt the at least one first large language model to generate the training samples comprise:
instructions that when executed cause the at least one processor to:
obtain a set of the potential queries;
for each of at least a subset of the potential queries, prompt the at least one first large language model to locate chunks of information that might be relevant to the potential query; and
use the located chunks of information to generate positive examples of potential queries in which the potential queries are answerable using the located chunks of information.

19. The non-transitory computer readable medium of claim 18, wherein the instructions when executed cause the at least one processor to identify each of the potential queries in the subset in response to a baseline large language model failing to identify a specified number of chunks of information for that potential query.

20. The non-transitory computer readable medium of claim 15, further containing instructions that when executed cause the at least one processor to:
provide an input query to a deployed retriever model comprising the trained embedding model, the deployed retriever model configured to identify a specified number of chunks of information relevant to the input query;
provide one or more of the specified number of chunks of information from the deployed retriever model to the generative model; and
prompt the generative model to create a response to the input query, the response based on the one or more of the specified number of chunks of information.

* * * * *